(12) United States Patent
McGillicuddy et al.

(10) Patent No.: US 10,737,300 B2
(45) Date of Patent: Aug. 11, 2020

(54) SYSTEM AND METHOD FOR MONITORING CLEANING CONDITIONS OF FACILITY USING CLEANING APPARATUS WITH TRACKING FEATURE

(71) Applicant: American International Group, Inc., New York, NY (US)

(72) Inventors: Rene McGillicuddy, Berkeley, CA (US); Brian Birch, New York, NY (US); Faye Sahai, New York, NY (US)

(73) Assignee: American International Group, Inc., New York, NY (US)

( * ) Notice: Subject to any disclaimer, the term of this patent is extended or adjusted under 35 U.S.C. 154(b) by 0 days.

(21) Appl. No.: 16/005,434

(22) Filed: Jun. 11, 2018

(65) Prior Publication Data

US 2018/0353999 A1 Dec. 13, 2018

Related U.S. Application Data

(60) Provisional application No. 62/517,160, filed on Jun. 9, 2017.

(51) Int. Cl.
*H01C 3/10* (2006.01)
*B08B 1/00* (2006.01)
(Continued)

(52) U.S. Cl.
CPC .............. *B08B 1/002* (2013.01); *B08B 13/00* (2013.01); *G01N 19/02* (2013.01);
(Continued)

(58) Field of Classification Search
CPC ......... A47L 15/46; B08B 1/002; B08B 13/00; G06F 11/00; G06F 7/00; H04W 4/30; G05B 19/048
(Continued)

(56) References Cited

U.S. PATENT DOCUMENTS

2005/0065662 A1* 3/2005 Reindle ................. A47L 9/2821
701/1
2007/0021944 A1* 1/2007 Levy ..................... G05D 1/0297
702/188

(Continued)

FOREIGN PATENT DOCUMENTS

JP 2015188490 A * 11/2015

OTHER PUBLICATIONS

Blaz, "What are Ble Beacons?" Common FAQs about the Bluetooth Beacon Technology, (Oct. 1, 2015) https://locatify.com/blog/beaocn-faq/.

(Continued)

*Primary Examiner* — Toan N Pham
(74) *Attorney, Agent, or Firm* — Leydig, Voit & Mayer, Ltd.

(57) ABSTRACT

Systems and methods for monitoring the cleaning conditions of a facility include the use of a cleaning apparatus with a tracking device. The tracking device is adapted to detect an operating parameter of the cleaning apparatus. In embodiments, the operating parameter includes at least one of the location of the cleaning apparatus within a facility over time, the movement of the cleaning apparatus, and the dynamic coefficient of friction encountered by a cleaning head of the cleaning apparatus as it traverses a surface being cleaned in the facility.

18 Claims, 18 Drawing Sheets

(51) Int. Cl.
*B08B 13/00* (2006.01)
*H04W 4/80* (2018.01)
*G07C 1/20* (2006.01)
*H04W 4/33* (2018.01)
*G01N 19/02* (2006.01)
*G06Q 10/06* (2012.01)
*G06Q 10/10* (2012.01)
*G07C 1/10* (2006.01)

(52) U.S. Cl.
CPC . *G06Q 10/06315* (2013.01); *G06Q 10/06395* (2013.01); *G06Q 10/1091* (2013.01); *G07C 1/10* (2013.01); *G07C 1/20* (2013.01); *H04W 4/33* (2018.02); *H04W 4/80* (2018.02)

(58) Field of Classification Search
USPC .................... 340/286.01; 702/188; 701/1, 23
See application file for complete search history.

(56) References Cited

U.S. PATENT DOCUMENTS

| | | |
|---|---|---|
| 2013/0212819 A1 | 8/2013 | Nortrup et al. |
| 2014/0022074 A1* | 1/2014 | Balinski ................ G16H 40/20 340/539.13 |
| 2014/0041136 A1 | 2/2014 | Kerr et al. |
| 2014/0224284 A1 | 8/2014 | Martine et al. |
| 2015/0158174 A1 | 6/2015 | Romanov et al. |
| 2016/0139067 A1* | 5/2016 | Grace ....................... A61L 2/28 702/130 |

OTHER PUBLICATIONS

"T500 Walk-Behind Floor Scrubber," Tennant (Apr. 2017).

* cited by examiner

FIG. 16

| Serial No. | Date | Time | Facility | Emp. ID | Emp. Name | Internal location | Cleaning done? | Coefficient of friction |
|---|---|---|---|---|---|---|---|---|
| 101 | 12/10/16 | 10:00 AM | San Jose | 45 | John Doe | Restroom | Y | |
| 102 | 12/12/16 | 1:00 PM | Santa Clara | 55 | Jane Doe | Kitchen | Y | |
| 102 | 12/12/16 | 1:00 PM | Santa Clara | 55 | Jane Doe | Restroom | N | |
| 103 | 12/15/16 | 4:00 PM | Santa Clara | 45 | Jane Doe | Restroom | | 0.60 |

Report generated by floor condition tracking program using information from the cleaning apparatus

111

SYSTEM AND METHOD FOR MONITORING CLEANING CONDITIONS OF FACILITY USING CLEANING APPARATUS WITH TRACKING FEATURE

CROSS-REFERENCE TO RELATED APPLICATION

This patent application claims the benefit of priority to U.S. Provisional Patent Application No. 62/517,160, filed Jun. 9, 2017, and entitled, "System and Method for Monitoring Cleaning Conditions of Facility Using Cleaning Apparatus with Tracking Device," which is incorporated in its entirety herein by this reference.

TECHNICAL FIELD

This patent disclosure relates, generally, to cleaning devices and systems and methods for monitoring the cleaning conditions of an interior environment of a facility and, more particularly, to such systems, methods, and cleaning devices having features and techniques for improving the ability to monitor the cleaning practices within a facility.

BACKGROUND

According to the Centers for Disease Control and Prevention (CDC), in 2015, costs for slip-and-fall accidents to Medicare alone totaled over $31 billion. This total does not include legal or non-Medicare related costs. The total expense resulting from slip-and-fall injuries in the United States is estimated to be approximately $100 million per day. According to the CDC, in 2008 more than 8.5 million Americans sustained injuries from an unintentional slip or fall—the leading cause of all nonfatal injuries treated in U.S. hospital emergency rooms. Common causes of slip-and-fall accidents include improper maintenance of walking and common areas, lack of cleanliness on floors leading to slippery surfaces when wet, and failure to clean floors after water or food spillage.

Slip and fall injuries are frequently associated with wet floors. Customers typically encounter such wet floors in the restroom of a facility, and employees frequently encounter such wet surfaces in a work area, such as a kitchen of a restaurant, for example. These injuries can result in numerous general liability and/or workers compensation claims.

Conventional techniques for evaluating floor conditions are complicated and expensive and are prone to human error. The cost and the effort involved in evaluating floor conditions makes the occurrence of such readings less frequent. This results in fewer safety readings being taken and a lack of alerts when dangerous floor conditions exist.

Most facilities depend on staff and janitorial contractors to self-report when they perform cleaning operations, typically via a hand-written log posted in an area designated for routine cleaning (e.g., a bathroom). This system is prone to human error and uncertain accuracy. It also requires manual effort to first enter the information and then to key it into an electronic format for management reporting. If a scheduled cleaning is not performed, it may be unlikely that a manager will discover such fact until much later, if at all.

There is a continued need in the art to provide additional solutions to help promote the cleanliness of facilities used by the public and to reduce the occurrence of slip-and-fall injuries. For example, there is a continued need for techniques for improving the ability to monitor the cleaning practices within a facility.

It will be appreciated that this background description has been created by the inventor to aid the reader, and is not to be taken as an indication that any of the indicated problems were themselves appreciated in the art. While the described principles can, in some respects and embodiments, alleviate the problems inherent in other systems, it will be appreciated that the scope of the protected innovation is defined by the attached claims, and not by the ability of any disclosed feature to solve any specific problem noted herein.

SUMMARY

This disclosure is directed to embodiments of systems and methods for monitoring the cleaning conditions of a facility. Embodiments of a kit for reducing the occurrence of slipping upon a floor surface are also described herein. Embodiments of a cleaning apparatus having a tracking device and suitable for use in systems and methods for monitoring the cleaning conditions of a facility are also described herein.

In one embodiment, a system for monitoring a cleaning condition of a facility includes a cleaning apparatus, a tracking assembly, a non-transitory computer-readable medium, and a processor. The tracking assembly is configured to monitor movement of the cleaning apparatus within the facility. The non-transitory computer-readable medium bears a floor condition tracking program.

The tracking assembly includes a first tracking unit and a plurality of second tracking units. The first tracking unit is associated with the cleaning apparatus. The second tracking units are located in spaced relationship to each other within the facility. The first tracking unit is configured to wirelessly emit a location signal. Each second tracking unit configured to interact with the first tracking unit to detect when the cleaning apparatus is within a detection area of the respective second tracking unit. The second tracking units are configured to transmit location data concerning the cleaning apparatus.

The processor is in operable arrangement with the second tracking units to receive the location data and in operable arrangement with the non-transitory, computer-readable medium. The processor is configured to execute the floor condition tracking program contained on the non-transitory computer-readable medium. The floor condition tracking program includes a tracking module configured to analyze the location data from the second tracking units to determine whether a predetermined cleaning operation was performed within a specified time schedule.

In another aspect, an embodiment of a method of monitoring a cleaning condition of a facility includes moving a cleaning apparatus upon a surface within the facility. A sensor is used to measure a condition of the surface upon which the cleaning apparatus is moving. The sensor generates a condition signal indicative of the condition measured by the sensor. The condition signal is transmitted to a processor. The processor is used to execute computer executable instructions stored on a non-transitory computer-readable medium to determine whether a parameter of the surface is within a predetermined range based upon the condition signal.

In still another aspect, an embodiment of a cleaning apparatus includes a scrubbing member, a sensor, and a communication device. The sensor is configured to measure a condition of a surface upon which the scrubbing member moves. The sensor is configured to generate a condition signal indicative of the condition measured by the sensor. The communication device is in electrical communication with the sensor to receive the condition signal. The communication device is configured to transmit the condition signal to a remote receiver.

As will be appreciated, the principles relating to monitoring the cleaning conditions of a facility and reducing the occurrence of slippery floor conditions disclosed herein are capable of being carried out in other and different embodiments, and capable of being modified in various respects. Accordingly, it is to be understood that both the foregoing general description and the following detailed description are exemplary and explanatory only and do not restrict the scope of the appended claims.

BRIEF DESCRIPTION OF THE DRAWINGS

FIG. 16 is a view of an embodiment of a graphical user interface suitable for use with a floor condition tracking application constructed according to principles of the present disclosure, illustrating dashboard details determined by a floor condition tracking application constructed according to principles of the present disclosure including the coefficient of friction readings determined by the floor condition tracking application based upon the strain sensor readings taken by the head of the cleaning apparatus of FIG. 13 and the time when and the place where the strain sensor readings were taken.

DETAILED DESCRIPTION

Figure 1:
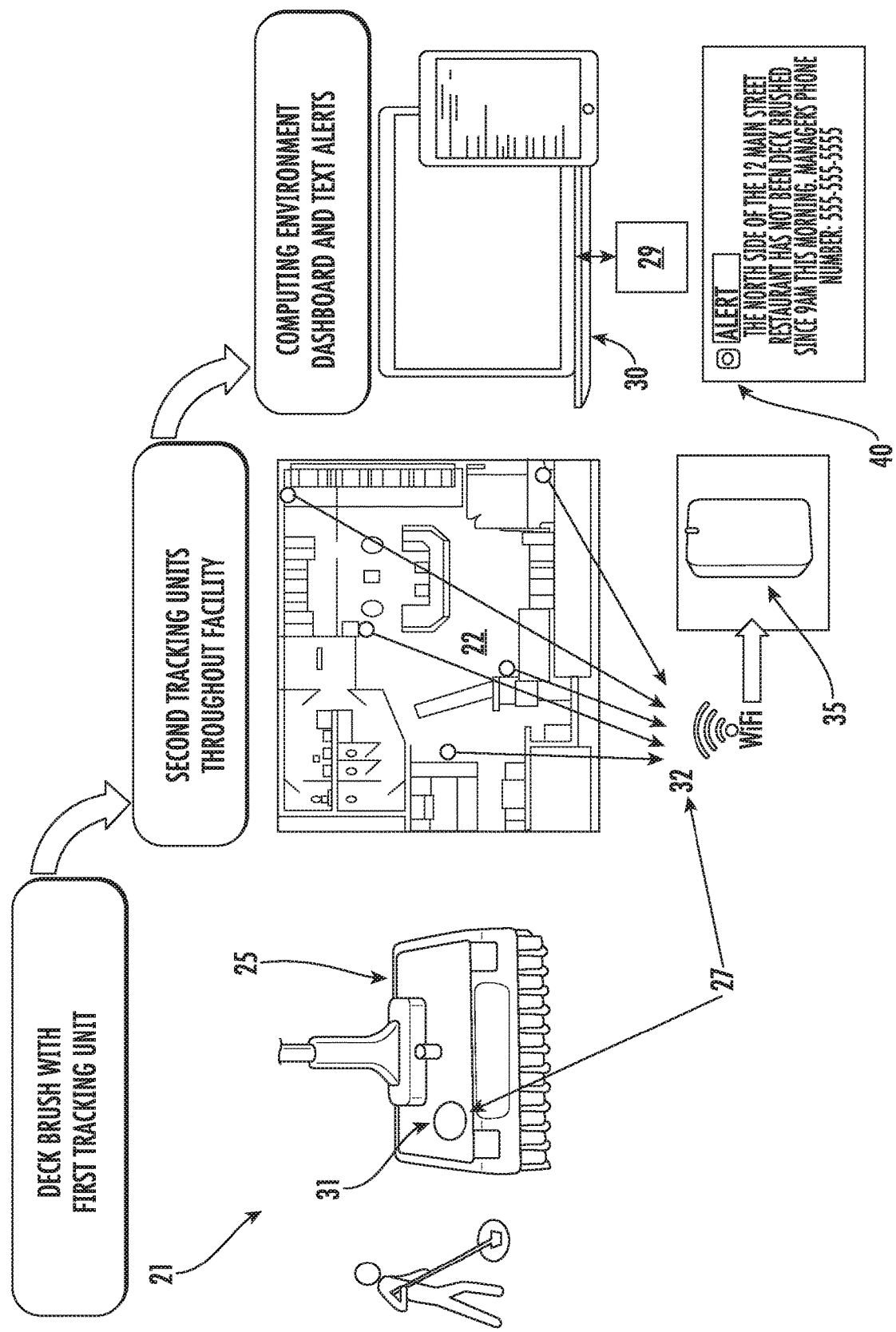
FIG. 1 is a schematic diagram of an embodiment of a system for monitoring the cleaning conditions of a facility which is constructed according to principles of the present disclosure.

Embodiments of systems and methods for monitoring the cleaning conditions of a facility are described herein. Embodiments of a kit for reducing the occurrence of slipping upon a floor surface are described herein. Embodiments of a cleaning apparatus having a tracking device and suitable for use in systems and methods for monitoring the cleaning conditions of a facility are also described herein. Further and alternative aspects and features of the disclosed principles will be appreciated from the following detailed description and the accompanying drawings.

Embodiments of systems and methods for monitoring the cleaning conditions of a facility constructed according to principles of the present disclosure can be used to improve the cleanliness of a facility and to reduce the occurrence of slip-and-fall accidents caused by poor floor conditions. Embodiments of systems and methods for monitoring the cleaning conditions of a facility following principles of the present disclosure can be used to reduce the occurrence of slippery floor conditions at the facility by monitoring for the regular practice of cleaning operations according to a predetermined schedule and/or cleaning regime. In embodiments, a cleaning apparatus is equipped with a tracking device to monitor at least one of the location of the cleaning apparatus within the facility, the movement of the cleaning apparatus about the facility, and the dynamic coefficient of friction encountered by the cleaning head of the cleaning apparatus as it traverses over a flooring surface during a cleaning operation. The ability to substantially continuously monitor the use of the cleaning apparatus and record dynamic coefficient of friction (DCOF) data can help make the common use space of a facility safer where slippery floor conditions are less likely to exist.

Embodiments of systems and methods for monitoring the cleaning conditions of a facility following principles of the present disclosure can provide a slip reduction service (SRS) via a tracking device-enabled service that automatically reports floor conditions and cleaning operation parameters (such as, length and location of cleaning operation). Cleaning operation data records can be transmitted via a suitable Internet-of-things type connection, as one skilled in the art will appreciate, and stored in a cloud-based platform allowing for improved monitoring of cleaning conditions at a facility and better management of safety conditions, as a result. Continuous monitoring of cleaning operations can provide more accurate records and reduce the occurrence of slip-and-fall accidents.

Embodiments of a system for monitoring the cleaning conditions of a facility following principles of the present disclosure can be used to track the location within the facility that is being cleaned. Embodiments of a system for monitoring the cleaning conditions of a facility following principles of the present disclosure can be used to authenticate the identity of the operator performing the cleaning operation. Embodiments of a system for monitoring the cleaning conditions of a facility following principles of the present disclosure can be used to alert a manager when a specified cleaning operation has not been performed by a given time (or within a given frequency) and/or within a given area of the facility. In embodiments, the system can include at least one cleaning apparatus which can be any suitable cleaning implement, such as, a broom, a brush, a mop, a duster, a propelled sweeper, an automatic floor scrubber, etc.

Embodiments of a system for monitoring the cleaning conditions of a facility following principles of the present disclosure can be used to measure the floor condition through the dynamic coefficient of friction. Embodiments of a system for monitoring the cleaning conditions of a facility following principles of the present disclosure can be used to alert a manager when the floor conditions fall outside of a specified acceptable range (e.g., the measured dynamic coefficient of friction falls below a predetermined value for that particular area of the facility).

Embodiments of a system for monitoring the cleaning conditions of a facility following principles of the present disclosure can include a central, cloud-based management system for analysis of the cleaning conditions of a given facility or over a number of different facilities within a designated region. Embodiments of a system for monitoring the cleaning conditions of a facility following principles of the present disclosure can include a suitable data storage system for storing detailed cleaning operation data logs for a given facility to track trends and monitor the cleaning conditions of the facility against a historical trajectory. In embodiments, more and better quality information on floor conditions and cleaning operations can be collected by lowering the cost and complexity of obtaining the cleaning data relative to other techniques.

It can also alert the store management if the floor is unsafe (e.g., due to a low coefficient of friction reading) and needs attention. By obtaining cleaning condition data more frequently and/or on a substantially continuous basis can help a manager respond faster to floor condition issues that require attention, such as to mitigate a slipper floor condition.

Embodiments of a method for monitoring the cleaning conditions of a facility following principles of the present disclosure can be used to help reduce the chances of human error in obtaining cleaning data and the false reporting of cleaning operations. The cleaning data is captured and stored automatically without human intervention.

Embodiments of a system for monitoring the cleaning conditions of a facility following principles of the present disclosure can be used to monitor cleaning operations within a facility. This monitors the cleaning of the facility to track whether a specified cleaning operation was performed on time and in the right areas. In embodiments, the system is adapted to track the identity of the operator who performed a particular cleaning operation. The system captures details of when the cleaning was performed automatically. It also can issue an automatic alert to a manager (e.g., via an automatically-prepared text message) informing the manager when a scheduled cleaning operation was not performed.

The Figures show a number of different embodiments of a system for monitoring the cleaning conditions of a facility constructed according to principles of the present disclosure. The Figures also show embodiments of a cleaning apparatus constructed according to principles of the present disclosure. The system can reduce the manual effort expended to record and report the occurrence of cleaning operations and the floor conditions (e.g., via friction readings).

In embodiments, a system for monitoring the cleaning conditions of a facility constructed according to principles of the present disclosure can include a cleaning apparatus with a tracking device mounted thereto, a plurality of user identification devices to identify which one of a plurality of operators is performing a given cleaning operation, a plurality of beacons adapted to track the location of the cleaning apparatus throughout the facility, a computer environment adapted to collect cleaning data from the facility and to monitor the cleaning conditions of the facility based upon the cleaning data it receives therefrom, and a suitable bridge for communicating cleaning data from the facility to the computing environment. In embodiments, a system for monitoring the cleaning conditions of a facility constructed according to principles of the present disclosure can have different arrangements as one skilled in the art will appreciate in view of the present disclosure.

Referring to FIG. 1, in one embodiment of a system 21 for monitoring a cleaning condition of a facility 22 constructed according to principles of the present disclosure, the system includes a cleaning apparatus 25, a tracking assembly 27, a non-transitory computer-readable medium 29, and a processor 30. The tracking assembly 27 is configured to monitor movement of the cleaning apparatus within the facility 22. The non-transitory computer-readable medium 29 bears a floor condition tracking program.

The tracking assembly 27 includes a first tracking unit 31 and a plurality of second tracking units 32. The first tracking unit 31 is associated with the cleaning apparatus 25. The second tracking units 32 are located in spaced relationship to each other within the facility. The first tracking unit 31 is configured to wirelessly emit a location signal. Each second tracking unit 32 is configured to interact with the first tracking unit 31 to detect when the cleaning apparatus 25 is within a detection area of the respective second tracking unit 32. The second tracking units 32 are configured to transmit location data concerning the cleaning apparatus 25.

In the illustrated embodiment, the first tracking unit 31 is mounted to the cleaning apparatus 25. In other embodiments, the first tracking unit 31 can also be in the form of a wearable communicator worn by the operator using the cleaning apparatus 25. The second tracking units 32 can be mounted in suitable locations about the facility, including either to walls or ceilings. The density of the second tracking units 32 distributed in the facility 22 can be adjusted according to intended cleaning operations desired to be monitored within the facility.

In embodiments, any suitable tracking units can be used. For example, in embodiments, suitable first and second tracking units 31, 32 can be used that are configured to communicate over one or more of Bluetooth, Wi-Fi, near field communication, and RFID arrangements. In one embodiment, the first tracking unit 31 is configured to generate a Bluetooth radio wave on a frequency between 2.402 GHz and 2.480 GHz, and the second tracking units 32 each comprises a Bluetooth beacon.

In embodiments, beacons 32 attached to the wall are used to track the location of the cleaning apparatus 25 within the facility. In embodiments, beacons 32 comprise any suitable device, such as a small, battery-operated unit that does not require any external wiring. In embodiments, the beacons 25 transmit their location via Bluetooth signals. A first tracking unit 31 attached to the cleaning apparatus 25 can be used to trigger the beacon 32 when the cleaning apparatus 25 is in the operating range of the beacon 32 to monitor the location of the cleaning apparatus within the facility 22.

Details on floor conditions and cleaning performed can be sent to a cloud-based platform. The beacons 32 can connect to a Wi-Fi network in the facility via a bridge 35 that can be tied into the electrical supply of the facility 22 (e.g., via a plug-and-receptacle connection or a hard-wired connection). The communication bridge 35 can be configured to receive location data from the beacons 32 and to transmit the location data to the processor 30. In embodiments, the bridge can be powered using the electrical supply found in the facility 22 (e.g., a standard wall receptacle).

The processor 30 is in operable arrangement with the second tracking units 32 to receive the location data and in operable arrangement with the non-transitory, computer-readable medium 29. The processor 30 is configured to execute the floor condition tracking program contained on the non-transitory computer-readable medium 29. The floor condition tracking program includes a tracking module configured to analyze the location data from the second tracking units 32 to determine whether a predetermined cleaning operation was performed within a specified time schedule.

In embodiments, the tracking module of the floor condition tracking program is configured, in response to determining a cleaning operation was not performed with the time schedule, to generate and send an electronic alert message 40 to at least one recipient to alert the recipient that the cleaning operation did not occur according to the time schedule. An example of such an alert 40 is shown in FIG. 1. In embodiments, in the event that a threshold value is met, an alert message can also be sent to a manager (e.g., via a text message or an email message).

In embodiments, the tracking device 31 mounted to the cleaning apparatus 25 is adapted to interact with the beacons 32 in the facility 22 to monitor the location and movement of the cleaning apparatus 25 throughout the facility. In use, the cleaning apparatus 25 can be tracked by the system 21 to monitor that the operators are performing the designated cleaning operations in different areas of the facility 22 according to the designated cleaning schedule. For example, in embodiments, the tracking assembly 27 comprises an RFID tracking system, with tags that can be attached to a cleaning head of a cleaning apparatus in the form of a deck brush and submersible in water.

The system 21 is adapted to generate cleaning data that can be used to record when the cleaning apparatus 25 is in motion. This can be recorded in different areas of a restaurant or other facility 22.

Figure 2:
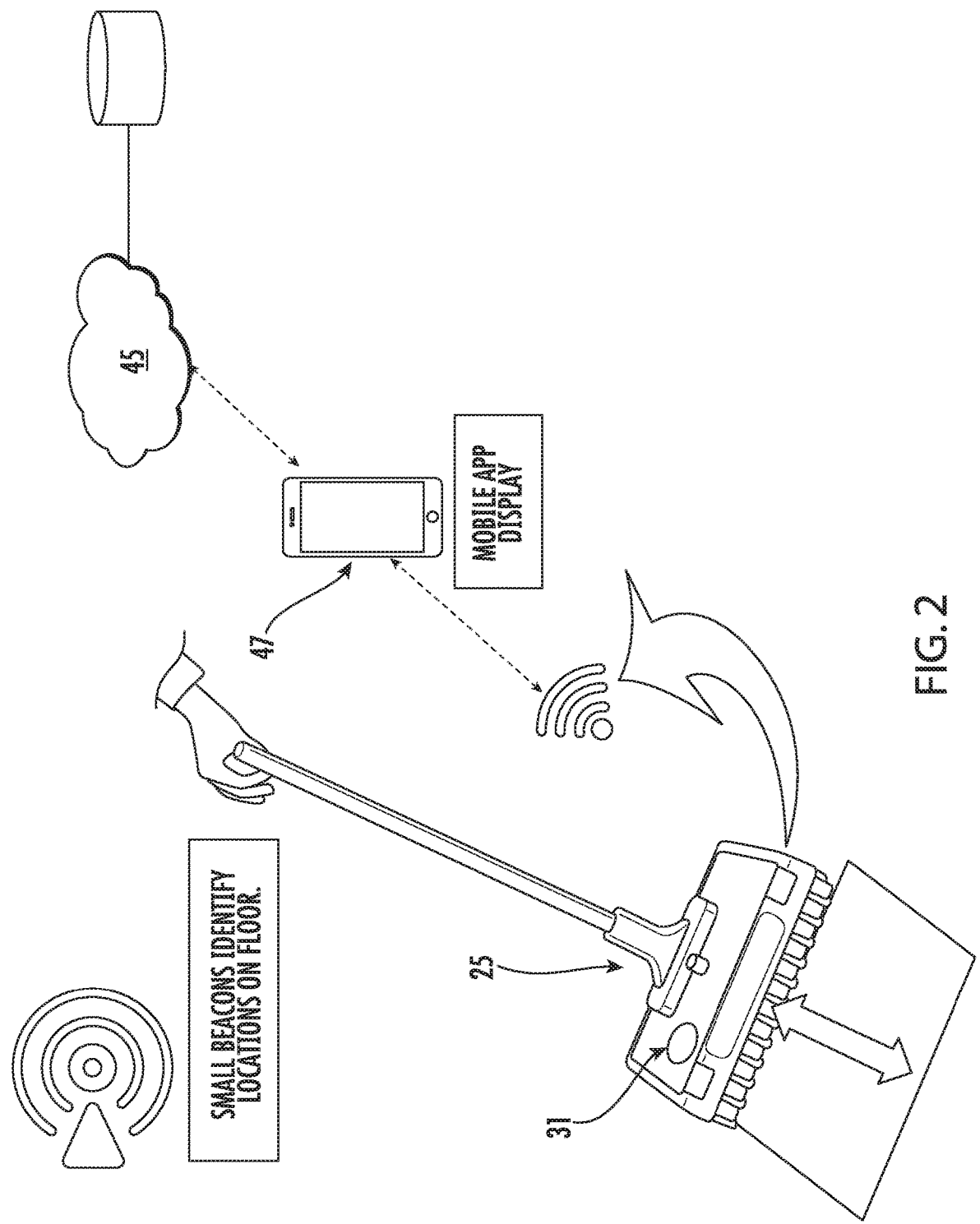
FIG. 2 is another schematic diagram of the system for monitoring the cleaning conditions of a facility of FIG. 1, illustrating a mobile app displayed via a cellular phone interconnected with a database of readings taken from an embodiment of a cleaning apparatus with a tracking device constructed according to principles of the present disclosure.

Referring to FIG. 2, information can be sent from the tracking device 31 of the cleaning apparatus 25 directly to the cloud 45 without any manual input. This also reduces the risk of human error and false reporting. The location is verified with beacons and the time and worker details are also automatically captured.

A mobile app for use on a portable device 47 (e.g., a smartphone) can be provided to allow an authorized user to access the cleaning data stored in the cloud 45. The cloud 45 can store a log of readings by time, operator, and location. The mobile app can be programmed to issue an alert if a slippery floor surface is detected or if a scheduled cleaning operation is not performed.

Figure 3:
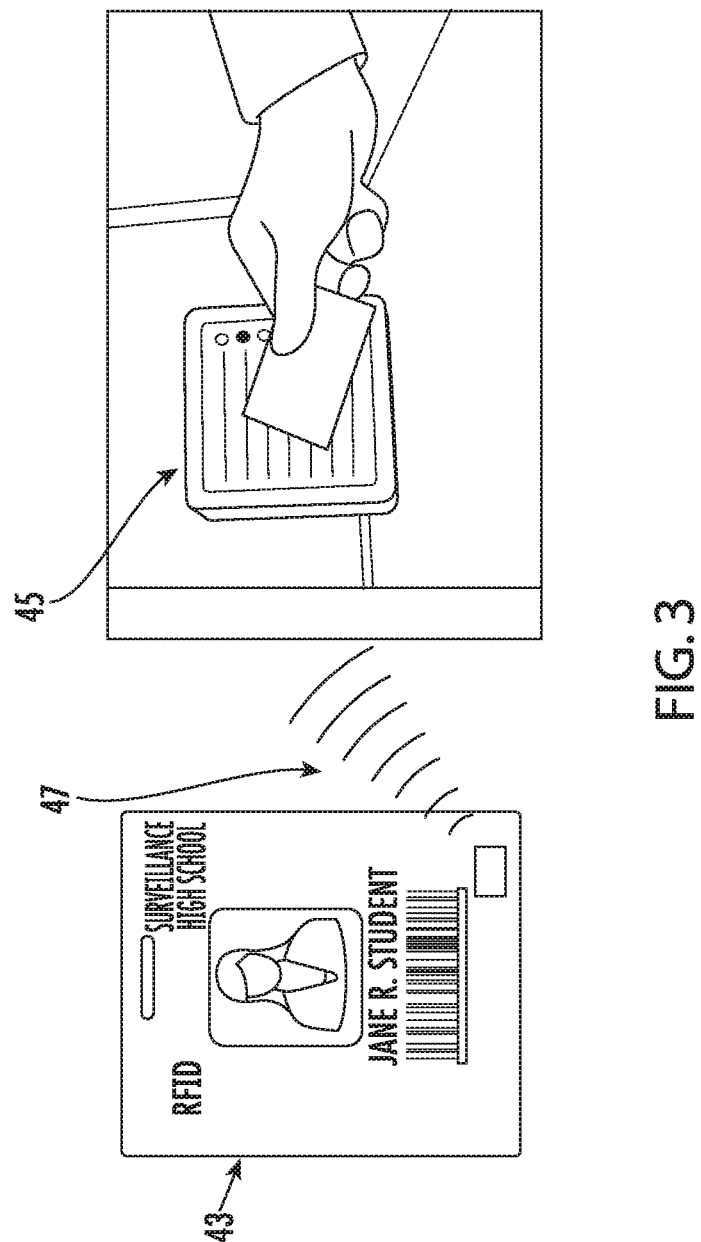
FIG. 3 is a schematic diagram of equipment suitable for use in the system of FIG. 1 adapted to be used to identify which one of a plurality of operators is conducting a cleaning and/or inspecting operation.

Referring to FIG. 3, each operator can be issued a user identification device 43. The user identification device 43 can be configured to transmit an identification signal 47 configured to identify which one of a plurality of operators is associated with the user identification device 43.

The system 21 can also include an identification reader 45. In embodiments, the identification reader 45 can be associated with the cleaning apparatus 25. The identification reader 45 can be configured to interact with the user identification device 43 to receive the identification signal 47 from the user identification device 43 and to transmit the identification signal 47 to the processor 30. The tracking module of the floor condition tracking program can be configured to associate the location data received from the cleaning apparatus 25 to the operator associated with the identification signal 47 received from the identification reader 45.

In embodiments, each operator is provided with a small badge which communicates by RFID. Workers scan their badge over the sensor to identify themselves before performing the cleaning or taking a friction reading. Their worker ID is transmitted along with the readings they take (along with the location, time and sensor serial number).

RFID tags confirm the identity of the worker who is conducting the cleaning or taking the friction reading. In embodiments, the worker first scans their ID badge (with integrated RFID) on a small reader that is on the cleaning device to associate their identity with the use of the particular cleaning device. In embodiments, a location-driven inspection log can be generated at the facility using the worker ID device to provide confirmation of adherence to the predetermined cleaning schedule. In embodiments, any suitable device can be used as a worker ID device. For example, any suitable wearable device can be used that can be worn on wrists, vests, or in shoe soles.

Figure 4:
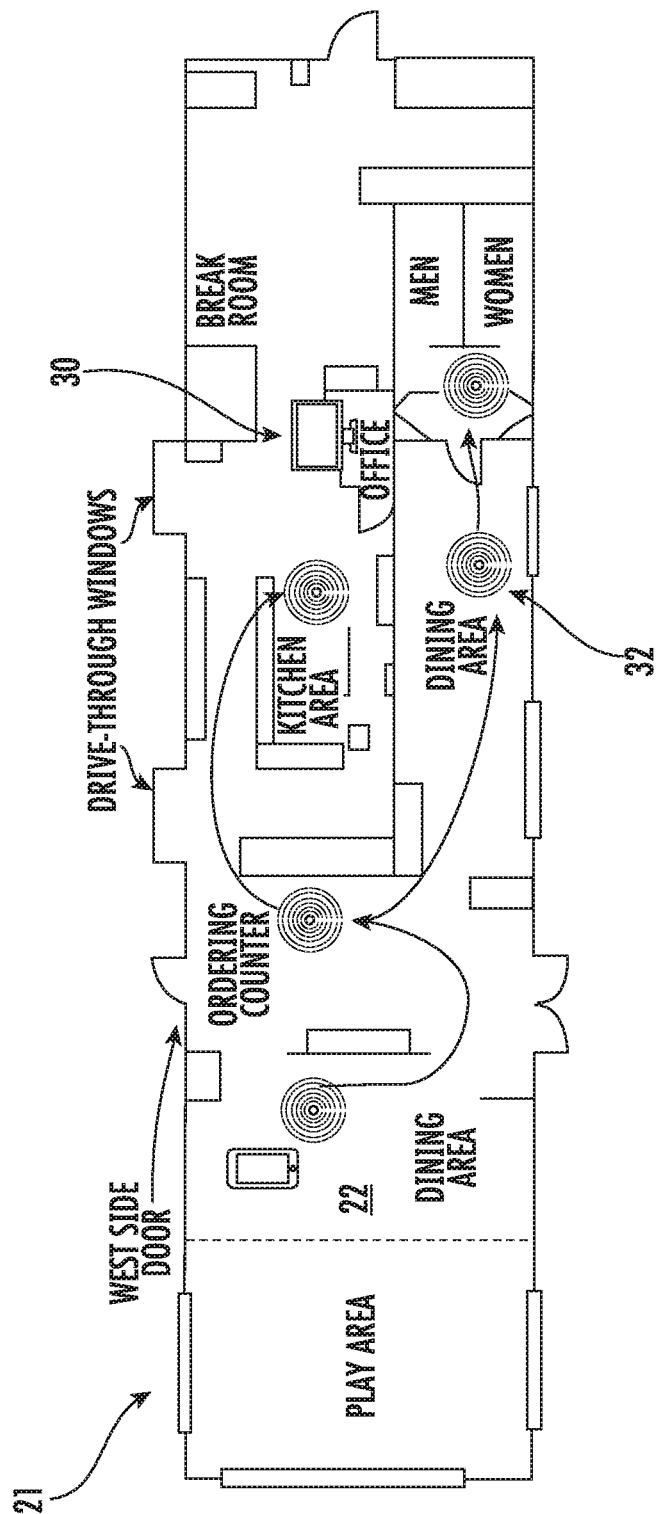
FIG. 4 is a schematic diagram of an embodiment of a system for monitoring the cleaning conditions of a facility which is constructed according to principles of the present disclosure, and which includes an embodiment of an inspection monitoring feature.

Referring to FIG. 4, in embodiments, the system 21 can be used to monitor for hazards and potential slip conditions. The operators can use the beacons to automatically document and time stamp their inspection of major areas by 'tapping' beacons to verify they actually checked the area for hazards. The beacons are distributed throughout the facility 22. The operator triggers a respective beacon in a designated location with the appropriate cleaning apparatus or other equipment, thereby time and date stamping the performed operation. The inspection log can be automatically updated to a secure cloud-based data vault. The log data can be retrieved for verification of operational standards and evidence of reasonable care, such as when defending a claim in a lawsuit.

Figure 5:
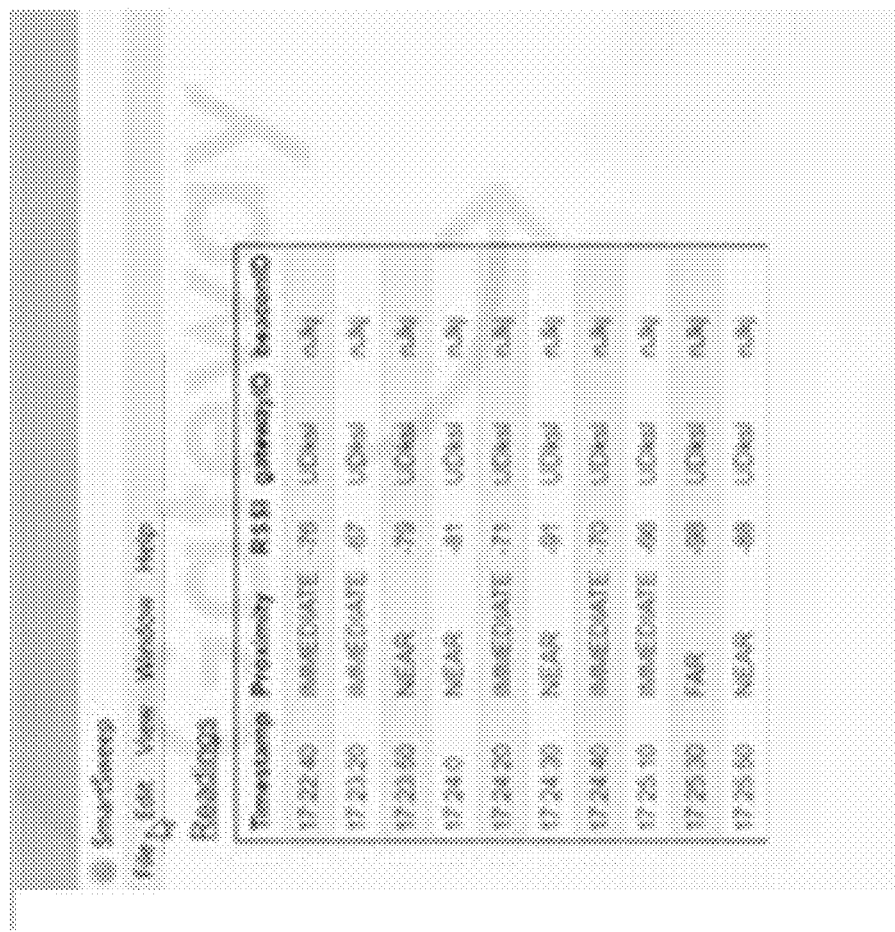
FIG. 5 is a view of an embodiment of a graphical user interface suitable for use with a floor condition tracking application constructed according to principles of the present disclosure, illustrating a series of proximity readings taken by a beacon with respect to the location tracking device mounted to a cleaning apparatus constructed according to principles of the present disclosure.

FIG. 5 is a view of an embodiment of a graphical user interface 50 suitable for use with a floor condition tracking application constructed according to principles of the present disclosure. In the illustrated display 50, a series of proximity readings taken by a beacon with respect to the location tracking device 31 mounted to the cleaning apparatus 25 is displayed.

Figure 6:
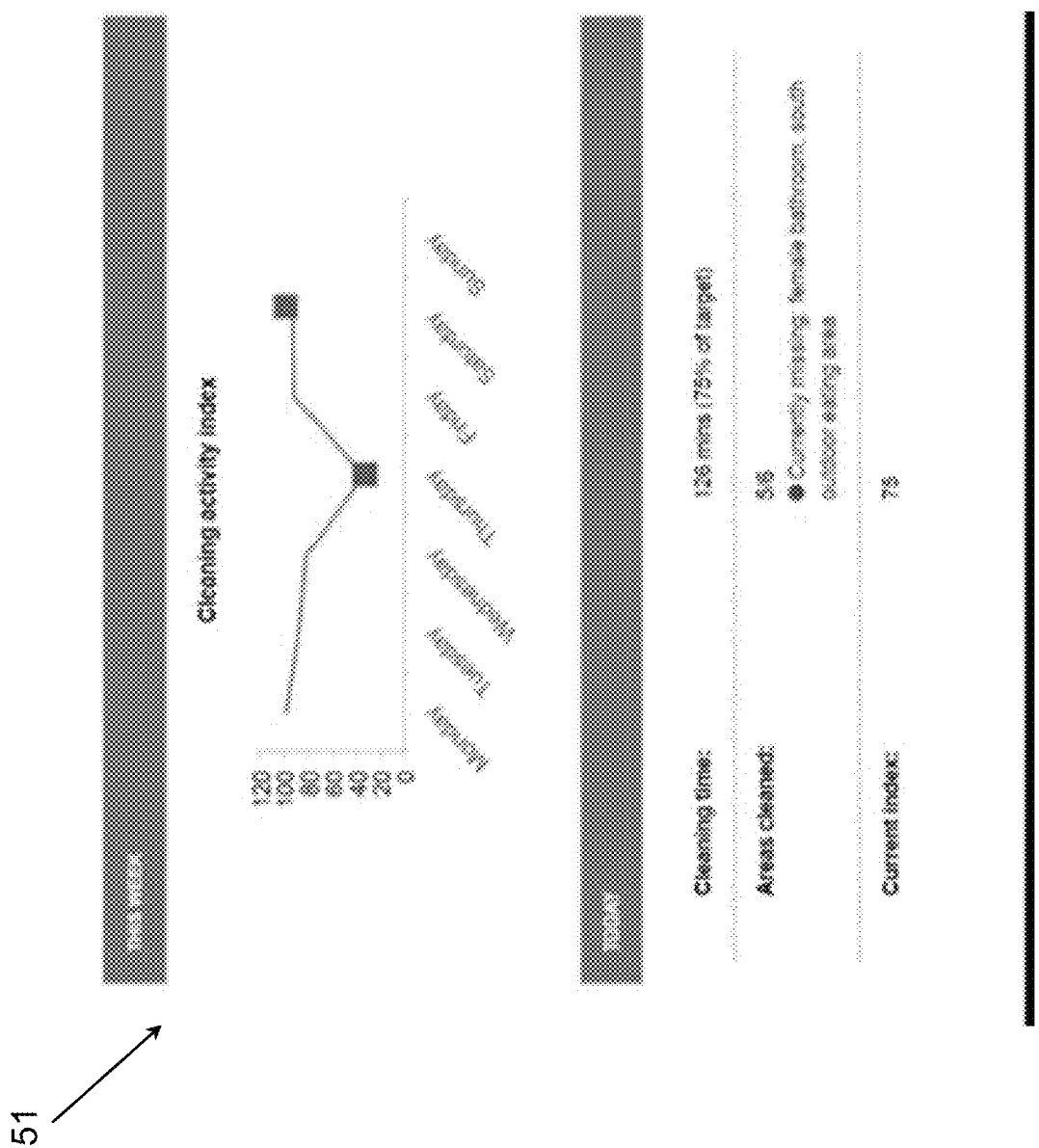
FIG. 6 is a view of another embodiment of a graphical user interface suitable for use with a floor condition tracking application constructed according to principles of the present disclosure, illustrating dashboard details determined by a floor condition tracking application constructed according to principles of the present disclosure including: tracked cleaning time in which the cleaning apparatus was being moved about the facility; the areas of the facility over which the cleaning apparatus was moved during the cleaning time; a cleaning score computed based upon the values of at least one of cleaning time and cleaning area in relation to a predetermined formula, and a trajectory of the facility's cleaning index performance over time.

FIG. 6 is a view of another embodiment of a graphical user interface 51 suitable for use with a floor condition tracking application constructed according to principles of the present disclosure. In the illustrated display 51, dashboard details determined by a floor condition tracking application constructed according to principles of the present disclosure are displayed including: tracked cleaning time in which the cleaning apparatus 25 was being moved about the facility 22; the areas of the facility 22 over which the cleaning apparatus 25 was moved during the cleaning time; a cleaning score computed based upon the values of at least one of cleaning time and cleaning area in relation to a predetermined formula, and a trajectory of the facility's cleaning index performance over time.

Figure 7:
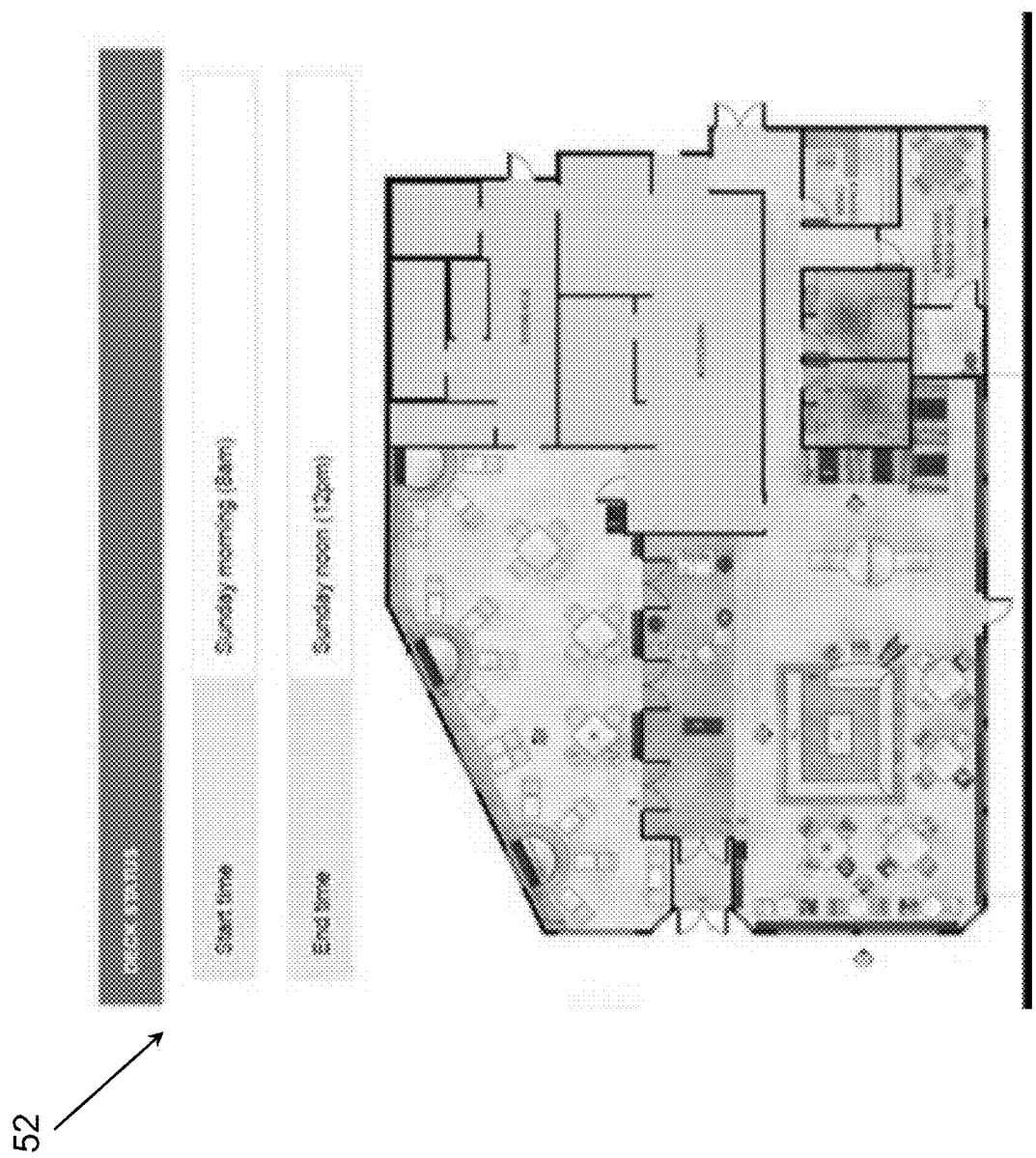
FIG. 7 is a view of another embodiment of a graphical user interface suitable for use with a floor condition tracking application constructed according to principles of the present disclosure, illustrating dashboard details determined by a floor condition tracking application constructed according to principles of the present disclosure including: the tracked cleaning start time, the tracked cleaning end time, and a pictorial representation of the areas cleaned during the cleaning time.

FIG. 7 is a view of another embodiment of a graphical user interface 52 suitable for use with a floor condition tracking application constructed according to principles of the present disclosure. In the illustrated embodiment, dashboard details determined by a floor condition tracking application constructed according to principles of the present disclosure are displayed including: the tracked cleaning start time, the tracked cleaning end time, and a pictorial representation of the areas in the facility 22 cleaned during the cleaning time.

Figure 8:
FIG. 8 is a view of still another embodiment of a graphical user interface suitable for use with a floor condition tracking application constructed according to principles of the present disclosure, illustrating dashboard details determined by a floor condition tracking application constructed according to principles of the present disclosure for a number of facilities distributed over a geographical region (e.g., over the United States of America).

FIG. 8 is a view of still another embodiment of a graphical user interface 53 suitable for use with a floor condition tracking application constructed according to principles of the present disclosure. In the illustrated embodiment, dashboard details determined by a floor condition tracking application constructed according to principles of the present disclosure for a number of facilities distributed over a geographical region (e.g., over the United States of America) are displayed. The dashboard view shown in FIG. 8 can provide a snapshot of data for a series of facilities 22. In embodiments, each dot represents a predetermined geographical area containing multiple facilities or a given facility. Each area/facility can be double clicked to launch a separate window displaying detailed cleaning data for the selected area/facility. The aggregated cleaning data can be used to help determine information, such as, metrics indicating failure points, period-over-period trends, and forecasts for mean time before failure information, for example.

Figure 9:
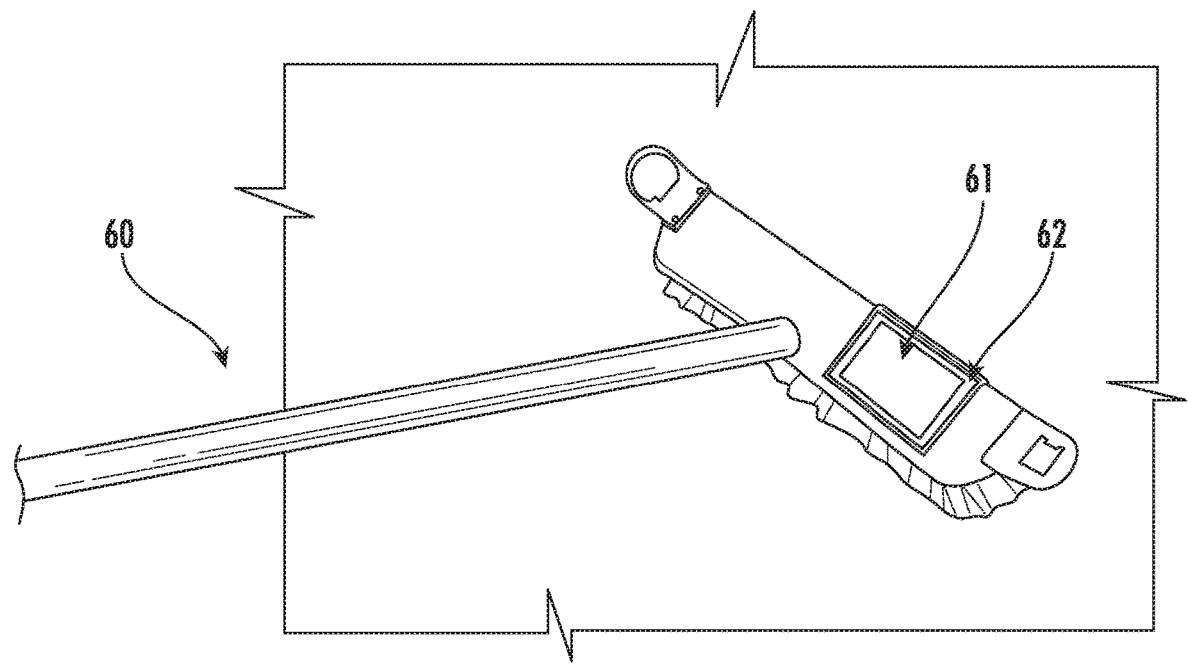
FIG. 9 is a perspective view of an embodiment of a cleaning apparatus constructed according to principles of the present disclosure which is suitable for use in the system for monitoring the cleaning conditions of a facility of FIG. 1.
Figure 10:
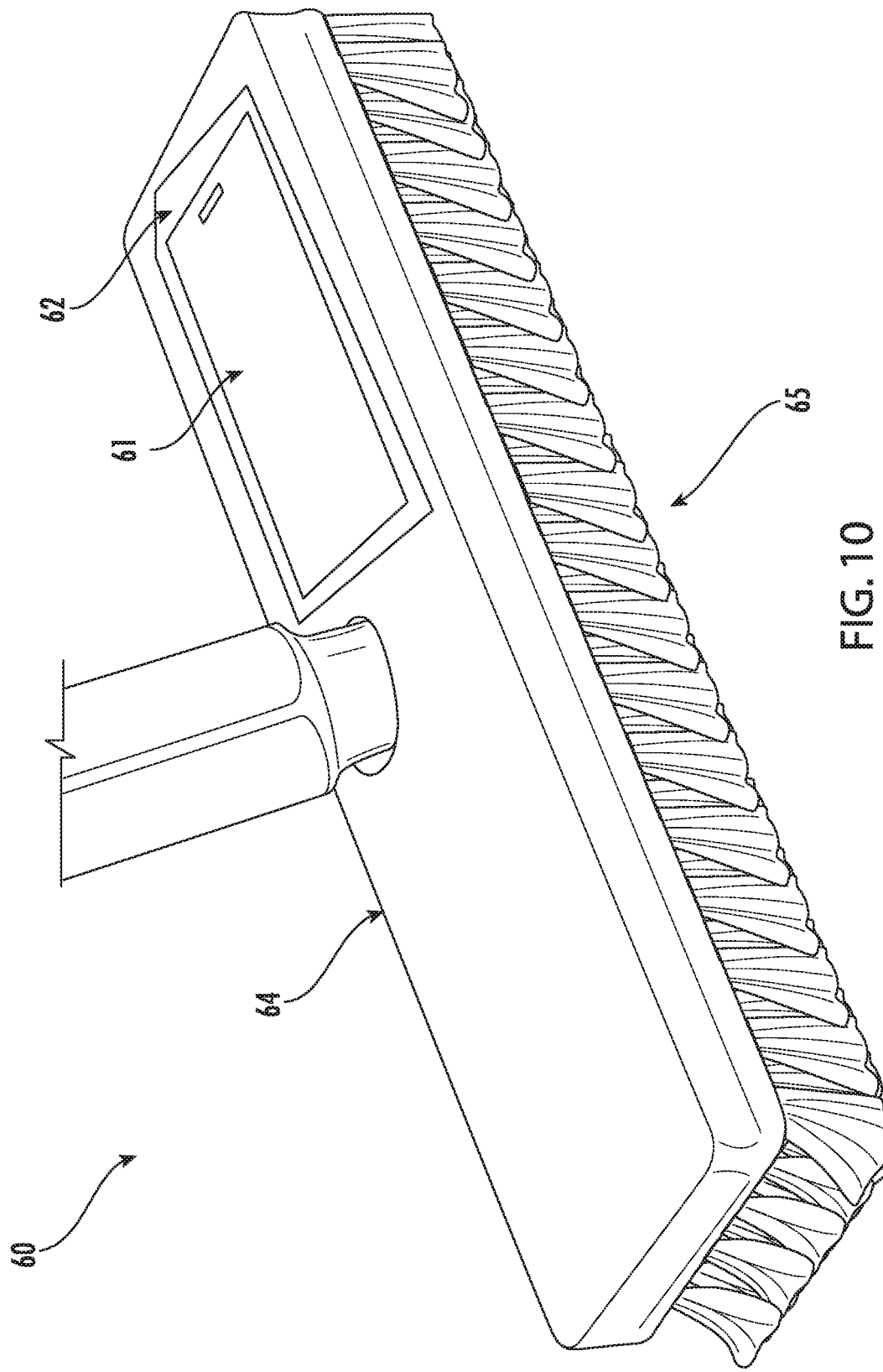
FIG. 10 is an enlarged detail view of an embodiment of a cleaning head in the form of a deck brush which is suitable for use in a cleaning apparatus constructed according to principles of the present disclosure.

In embodiments, the cleaning apparatus can have any suitable configuration as one skilled in the art will appreciate. For example, in embodiments, the cleaning apparatus can be in the form of a deck brush 60 with a tracking device 61 mounted thereto under a protective layer 62 (see, e.g., FIGS. 9 and 10). In embodiments, the deck 64 can have bristles 65 attached thereto that are configured for performing a cleaning operation. In embodiments, the bristles 65 can be made from any suitable material, such as, any combination of ferrous wire, nonferrous wire, plastic, abrasive filaments, vegetable fibers, animal hair, or other materials known to those skilled in the art.

Figure 11:
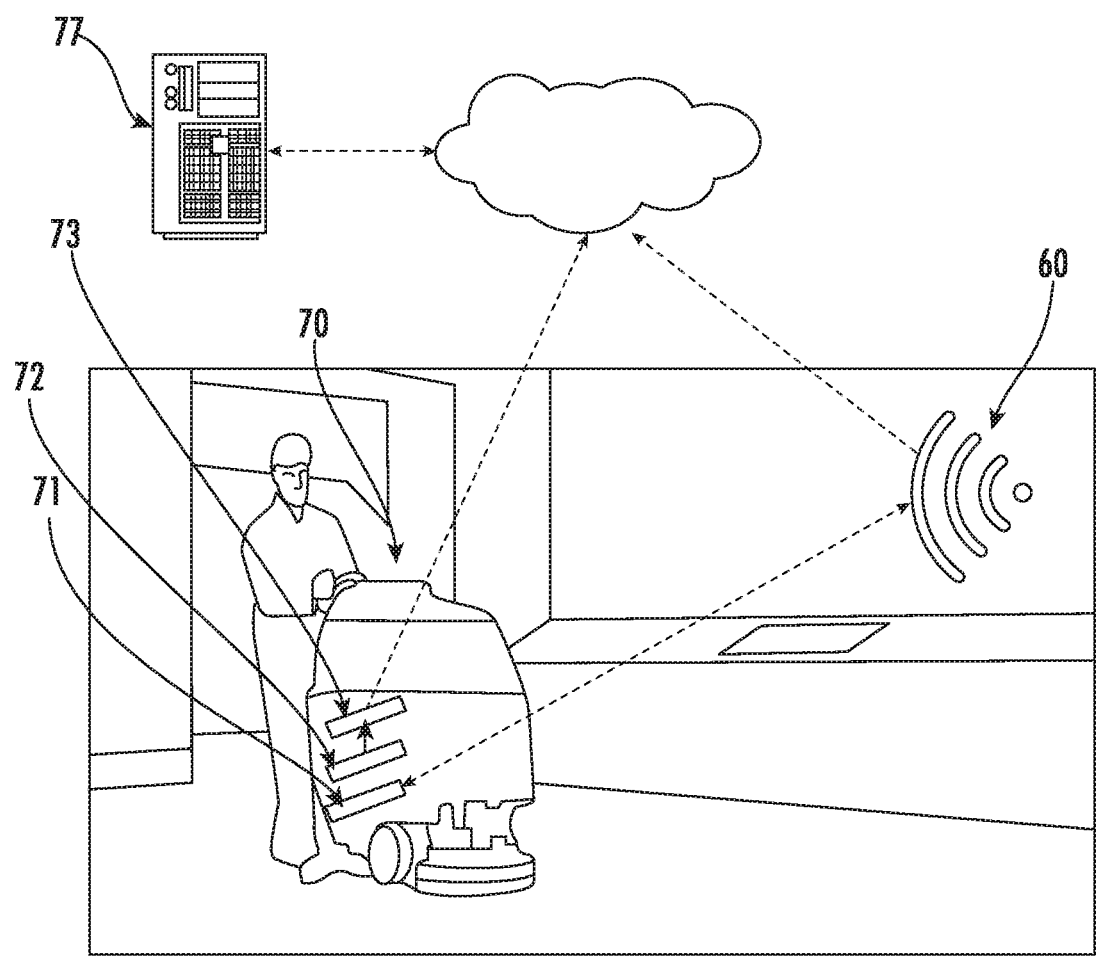
FIG. 11 is a schematic diagram of another embodiment of a system for monitoring the cleaning conditions of a facility which is constructed according to principles of the present disclosure, and including an embodiment of a cleaning apparatus constructed according to principles of the present disclosure which includes a tracking device in the form of an accelerometer to determine when the cleaning apparatus is in motion.

Referring to FIG. 11, in embodiments, the cleaning apparatus can be in the form of a powered, walk-behind sweeper 70, such as those commercially-available from Tennant Co. of Minneapolis, Minn., or Global Industrial of Port Washington, N.Y., for example. In embodiments, the cleaning apparatus 70 includes a first tracking unit 71, a motion detector 72, and a communication device 73. The first tracking unit 71 can be configured to interact with the second tracking units 74 distributed throughout the facility in order to provide location data to the floor condition tracking program as previously described.

The motion detector 72 is configured to detect movement of the cleaning apparatus 70 upon a surface within the facility during a cleaning operation. The motion detector 72 is configured to generate a motion signal indicative of the movement of the cleaning apparatus 70 upon the surface.

The communication device 73 is in electrical communication with the motion detector 72 to receive the motion signal. The communication device 73 is configured to transmit the motion signal to the processor 77. The tracking module of the floor condition tracking program is configured to analyze the motion signal to determine whether the cleaning operation has been performed within the specified time schedule.

In embodiments, the cleaning apparatus can include a motion detector 72 in the form of an accelerometer. The accelerometer can be configured to detect the movement of the cleaning apparatus to generate a signal indicative of such movement. The accelerometer signal can be acquired by the beacons 74 and/or the bridge for transmission to the computing environment. In embodiments, the cleaning apparatus 70 is configured to report its location to a mobile app and cloud service based on the accelerometer 72 readings. The sensor 72 can measure movement and be used to monitor how long the cleaning apparatus 70 is being used. In embodiments, a tracking device can be included that is configured to detect and capture movement, time and number of brush strokes (in embodiments in which the cleaning apparatus includes a brush head).

Figure 12:
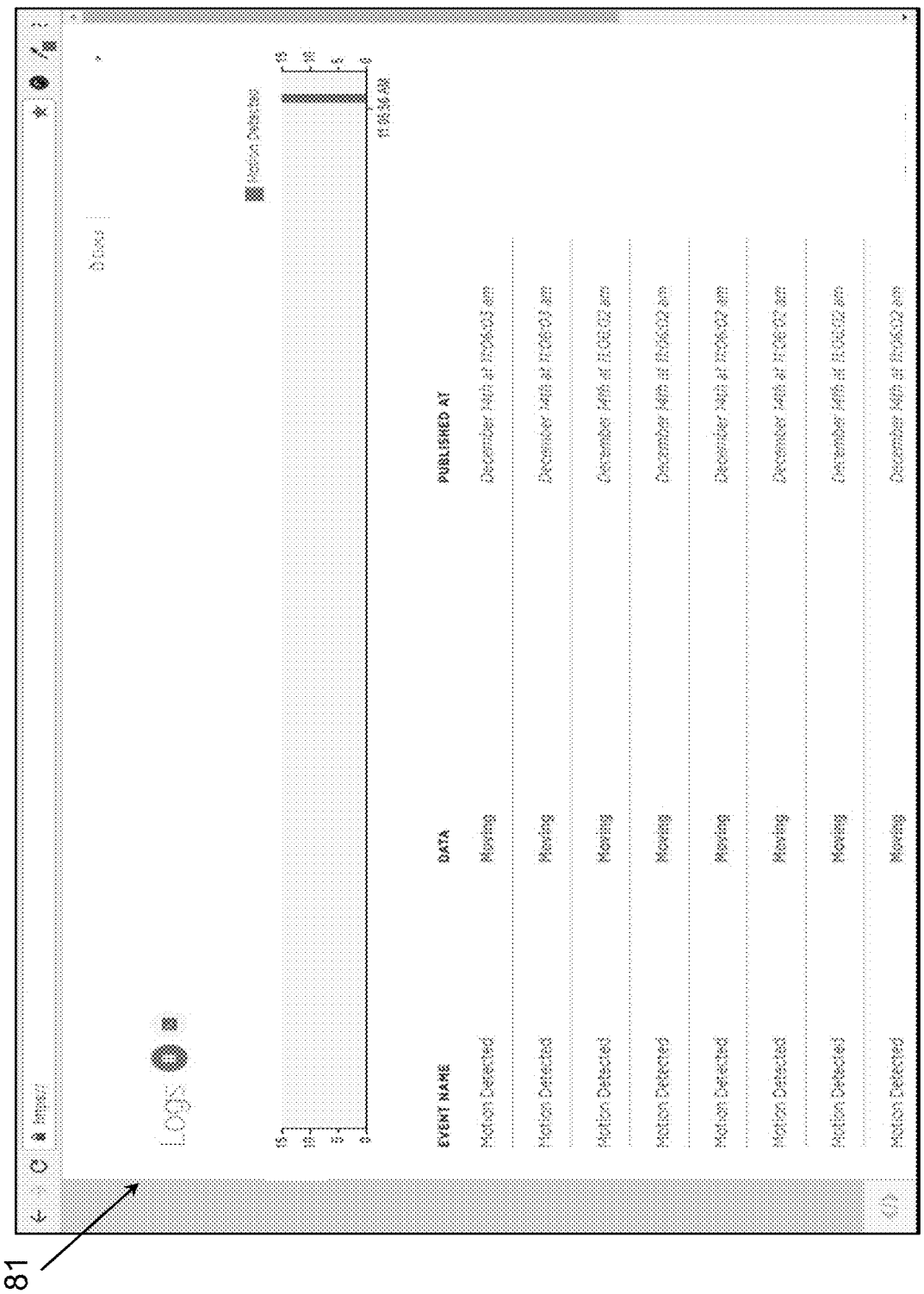
FIG. 12 is a view of an embodiment of a graphical user interface suitable for use with a floor condition tracking application constructed according to principles of the present disclosure, illustrating a series of movement readings taken by an accelerometer mounted to a cleaning apparatus constructed according to principles of the present disclosure.

FIG. 12 is a view of an embodiment of a graphical user interface 81 suitable for use with a floor condition tracking application constructed according to principles of the present disclosure. In the illustrated embodiment, a series of movement readings taken by the accelerometer 72 mounted to the cleaning apparatus 70 is shown.

In embodiments, the cleaning apparatus can include a sensor that is adapted to measure the condition of the floor.

In embodiments, the cleaning apparatus includes a sensor and a communication device. The sensor is configured to measure a condition of a surface upon which the cleaning apparatus moves. The sensor is configured to generate a condition signal indicative of the condition measured by the sensor. The communication device is in electrical communication with the sensor to receive the condition signal. The communication device is configured to transmit the condition signal to the processor. The floor condition tracking program includes a floor condition module configured to determine whether a parameter of the surface is within a predetermined range based upon the condition signal.

In embodiments, the sensor is configured to measure a friction condition of the surface upon which the cleaning apparatus moves. The floor condition module can include a computer executable calculation code segment configured to determine a coefficient of friction encountered by the cleaning apparatus moving upon the surface based upon the condition signal received from the sensor.

For example, in embodiments, the sensor is configured to measure the dynamic coefficient of friction of the floor surface over which the cleaning apparatus is moving. This dynamic coefficient of friction is a value that describe the ability of the surfaces to resist the sliding or slipping of an object across the surface. In general, the lower the coefficient of friction, the more slippery it can be considered. In embodiments, the system can be configured to obtain measurements form the tracking device that can be used to compute a dynamic coefficient of friction that correlates to one computed via the Dynamic Coefficient of Friction (DCOF) method in ANSI A137.1, the American National Standard Specifications for Ceramic Tile.

In embodiments, the cleaning apparatus can include a sensor in the form of a strain sensor. The strain sensor can be arranged with the cleaning apparatus such that the strain sensor is configured to measure a resistance encountered by the cleaning apparatus as the cleaning apparatus moves upon the surface. The strain sensor can be configured to measure the level of effort (tension) needed to move the cleaning device laterally over the floor. This measured strain can correspond to the coefficient of friction. The strain sensor can be configured to generate a strain signal indicative of the measured resistance. In embodiments, the strain sensor readings can be transmitted to a mobile app and also to a cloud based reporting service. In embodiments, the computing environment includes a floor condition tracking program that is adapted to determine a friction coefficient based upon the strain sensor readings. The floor condition tracking program can include a calculation code segment configured to determine a dynamic coefficient of friction encountered by the cleaning apparatus moving upon the surface based upon the strain signal received from the strain sensor.

In embodiments, a cleaning apparatus constructed according to principles of the present disclosure can include a scrubbing member, a sensor, and a communication device. The sensor is configured to measure a condition of a surface upon which the scrubbing member moves. The sensor is configured to generate a condition signal indicative of the condition measured by the sensor. The communication device is in electrical communication with the sensor to receive the condition signal. The communication device is configured to transmit the condition signal to a remote receiver. In embodiments, the sensor is configured to measure a friction condition of the surface upon which scrubbing member moves.

In embodiments, the cleaning apparatus includes a motion detector. The motion detector is configured to detect movement of the scrubbing member upon the surface. The motion detector is configured to generate a motion signal indicative of the movement of the scrubbing member upon the surface. The communication device is in electrical communication with the motion detector to receive the motion signal. The communication device is configured to transmit the motion signal to a remote receiver. In embodiments, the motion detector is an accelerometer.

In embodiments, the cleaning apparatus can be used to measure the surface friction coefficient to determine how slippery a floor surface is and to provide metrics that help facility managers determine whether their implemented cleaning procedures have improved the condition of the floor. An operator can use the slip meter to measure friction of the floor at pre-set locations and times. The floor condition data can be stored in a cloud-based storage. Data can be displayed on a dashboard for the time period selected. Measurement intervals can be varied in different embodiments (e.g., hourly, daily, weekly, and/or monthly). When a condition is detected that breach a threshold value, an automatic message can be generated and sent to selected managers for real time corrective action.

Figure 13:
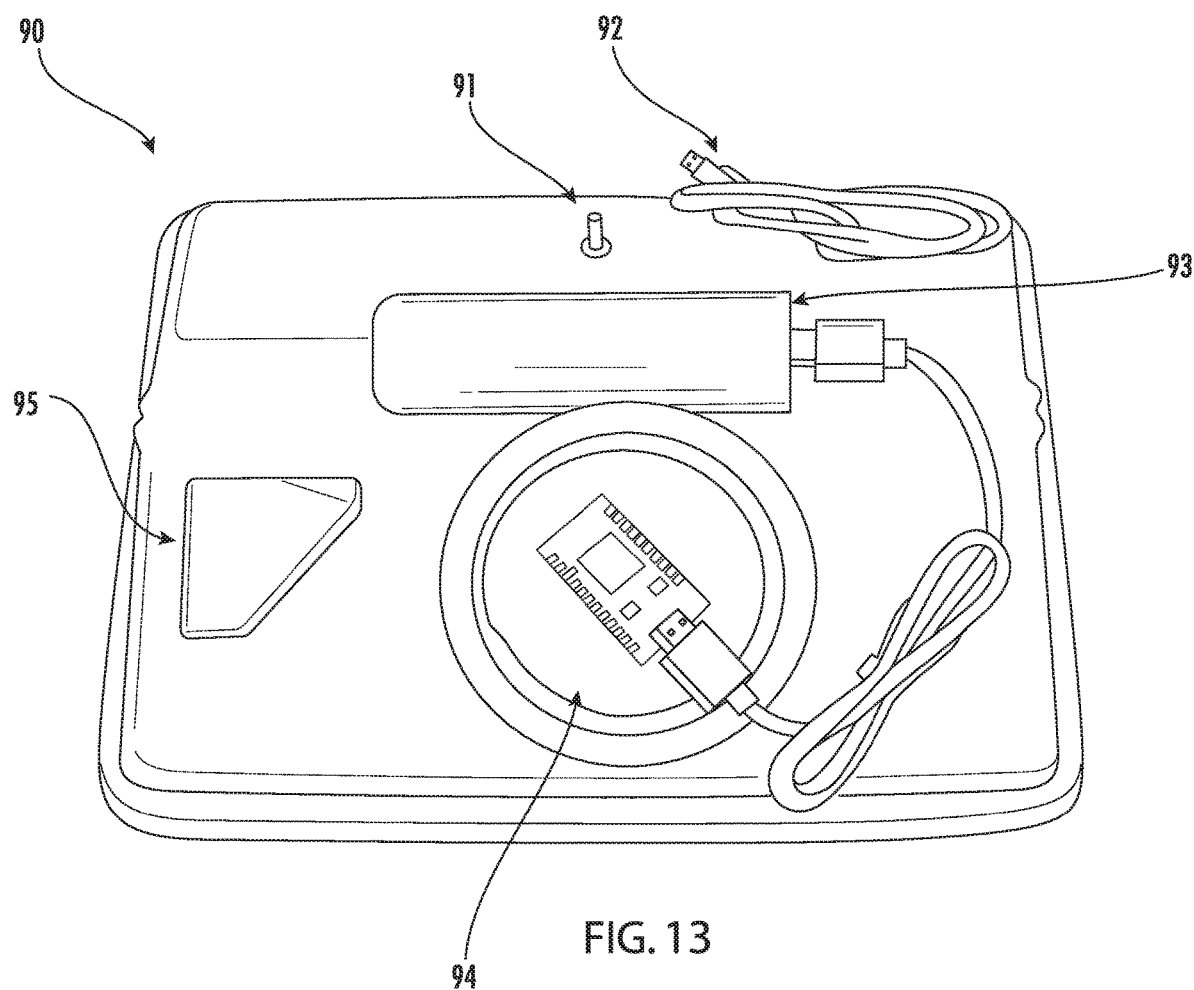
FIG. 13 is a top view of an embodiment of a head of a cleaning apparatus adapted for use in the system of FIG. 14 to calculate the dynamic coefficient of friction of the floor surface over which the cleaning apparatus is traversing.
Figure 14:
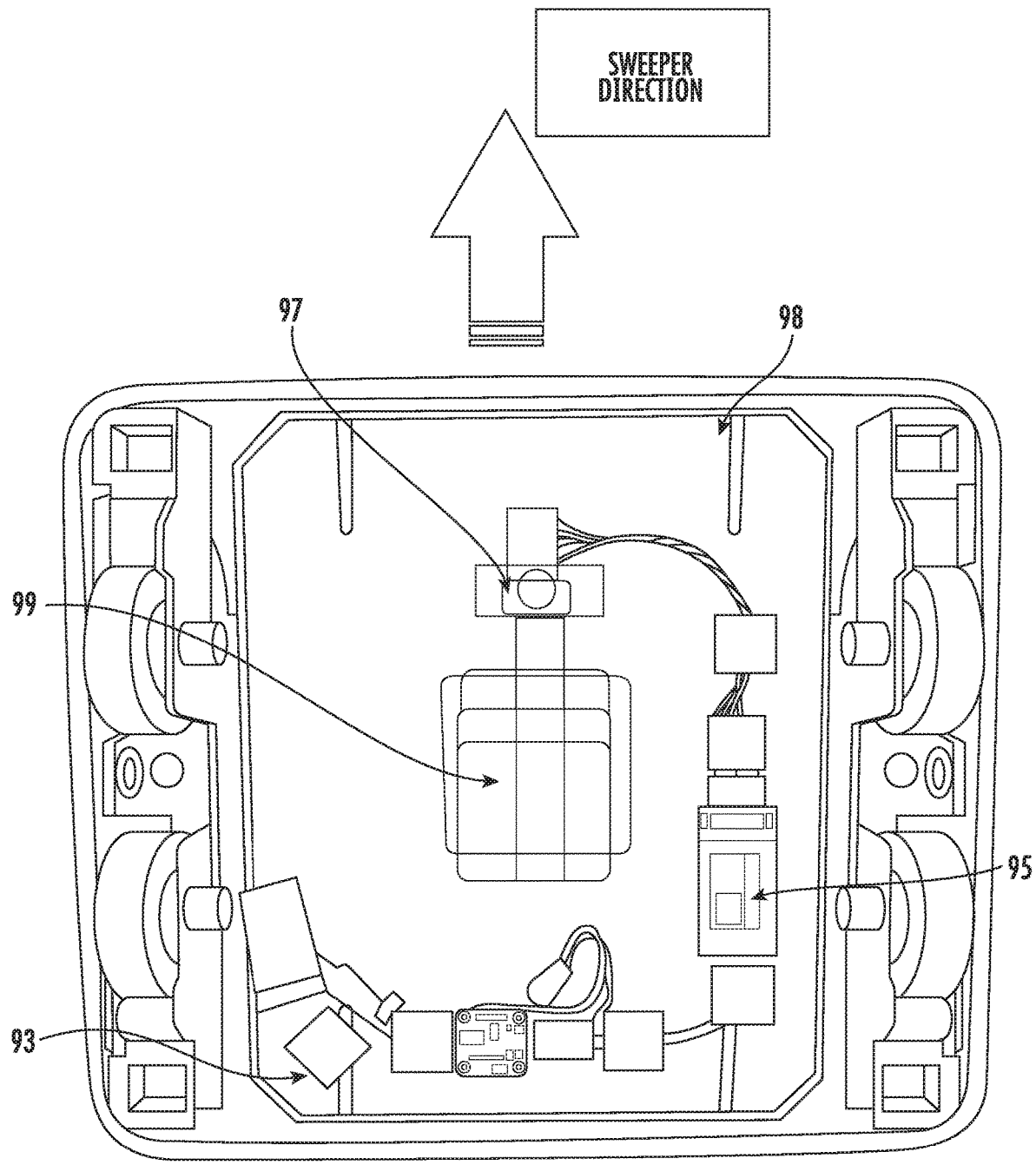
FIG. 14 is a bottom view of the head of the cleaning apparatus of FIG. 13.

An example of a cleaning apparatus 80 with a sensor configured to determine the condition of the floor by assessing its coefficient of friction is shown in FIGS. 13 and 14. Referring to FIG. 13 a scrubbing member of the cleaning apparatus 90 is shown that includes an on/off switch 91, a charging cord 92, a battery 93 (or other suitable power source), an accelerometer 94 to measure and detect movement and speed, a Bluetooth beacon 95 to determine the location of the cleaning apparatus 90 in the facility. The cleaning apparatus 90 includes a strain sensor 97 adapted to measure the resistance encountered by the cleaning apparatus 90 as it moves along the floor and a base plate 98 to protect the strain sensor 97. In embodiments, the base plate 98 can be made from any suitable material, such as a suitable acrylic, for example.

The strain sensor 97 is configured to be stretched as the cleaning apparatus 90 is moved over the floor via the sensor foot 99. The amount of stretch detected by the strain sensor is proportional to the friction that the cleaning apparatus 90 encounters on the floor. A floor condition tracking program constructed according to principles of the present disclosure can be used to determine a value for the dynamic coefficient of friction of the flooring surface over which the cleaning apparatus is travelling.

The strain sensor 97 is configured to measure a condition of a surface upon which the scrubbing member moves. The strain sensor 97 is configured to generate a condition signal indicative of the condition measured by the sensor. In the illustrated embodiment, the strain sensor 97 is configured to measure a resistance encountered by the scrubbing member as the scrubbing member moves along a surface being cleaned. The strain sensor 97 is configured to generate a strain signal indicative of the resistance The beacon 95 is in electrical communication with the strain sensor 97 to receive the condition signal. The beacon 95 is configured to transmit the condition signal to a remote receiver.

The dynamic coefficient of friction is measured as the cleaning apparatus 90 is rolled along the floor. The readings from the strain sensor 97 are reported in real-time to the cloud along with time, location in facility and the identity of the person who took the readings. This reduces the effort involved in taking readings, faulty reporting, and missed cleanings.

In embodiments, the self-contained tracking device can be in the form of a strain sensor attached to the cleaning device being used at the facility. The strain sensor can be adapted to continuously measure the dynamic coefficient of friction as the cleaning device moves over the floor. The strain sensor can be disposed within a housing to help enhance the durability of the sensor.

In embodiments, the cleaning apparatus is fitted with a sensor (e.g., a strain sensor) that produces measurements which can be correlated to the dynamic coefficient of friction on the floor's surface. It captures details of the worker performing the measurement as well as the location within the facility (from beacons) where the reading was taken. It reports this information to a cloud based management service along with the date, time and device used to take the measurement. Readings are transmitted to a cloud based management portal through a cellular connection. Analytics track the slipperiness of the floor and alert management when attention is needed or a cleaning has been missed.

Figure 15:
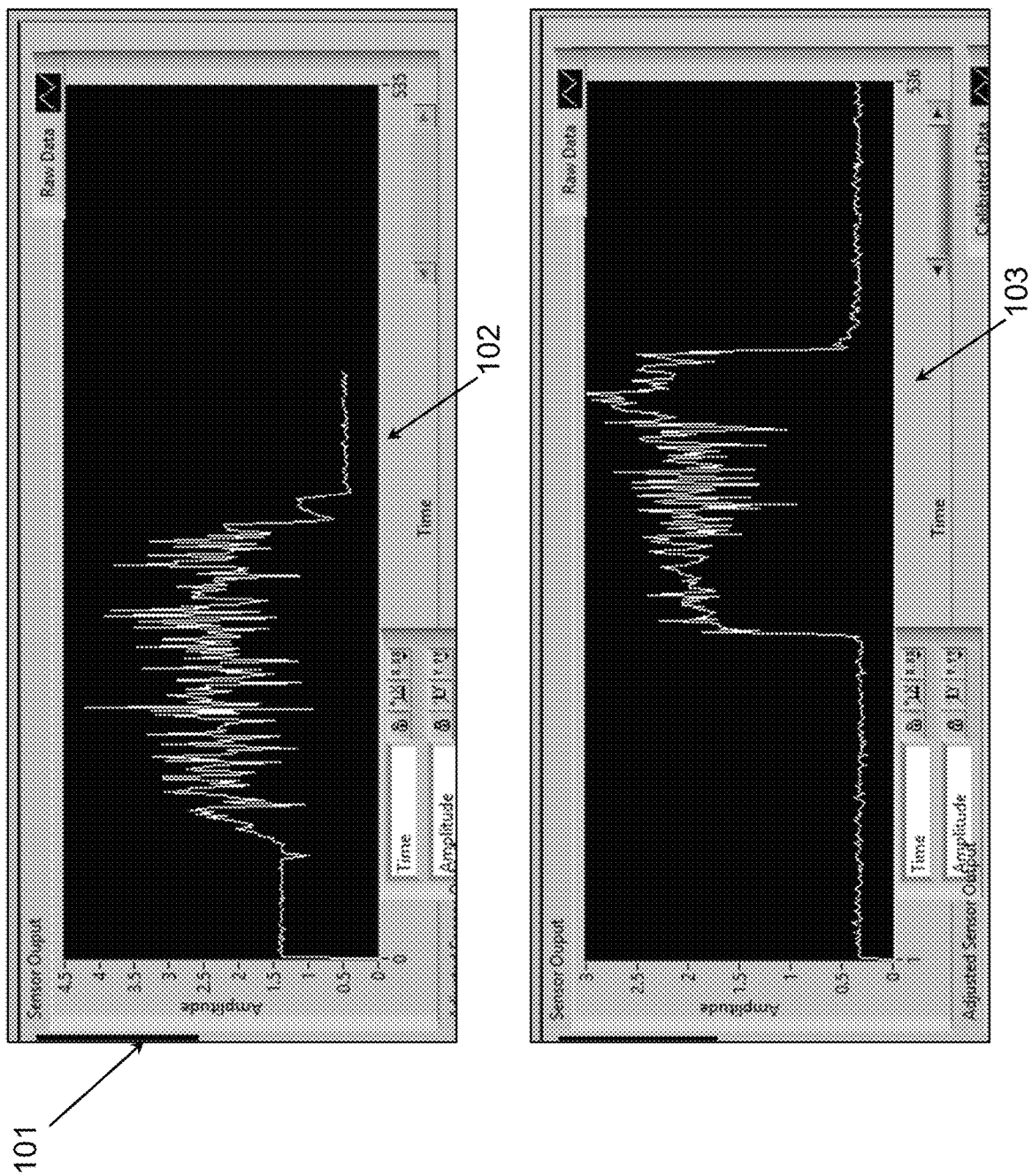
FIG. 15 is a view of an embodiment of a graphical user interface suitable for use with a floor condition tracking application constructed according to principles of the present disclosure, illustrating a series of strain sensor readings taken by the head of the cleaning apparatus of FIG. 13.

FIG. 15 is a view of an embodiment of a graphical user interface 101 suitable for use with a floor condition tracking application constructed according to principles of the present disclosure. In the illustrated embodiment, a series of strain sensor readings 102, 103 taken by the head of the cleaning apparatus 90 of FIG. 13 is illustrated.

FIG. 16 is a view of an embodiment of a graphical user interface 111 suitable for use with a floor condition tracking application constructed according to principles of the present disclosure. In the illustrated embodiment, dashboard details are illustrated which were determined by a floor condition tracking application constructed according to principles of the present disclosure including the coefficient of friction readings determined by the floor condition tracking application based upon the strain sensor readings taken by the head of the cleaning apparatus 19 of FIG. 13 and the time when and the place where the strain sensor readings were taken.

Figure 17:
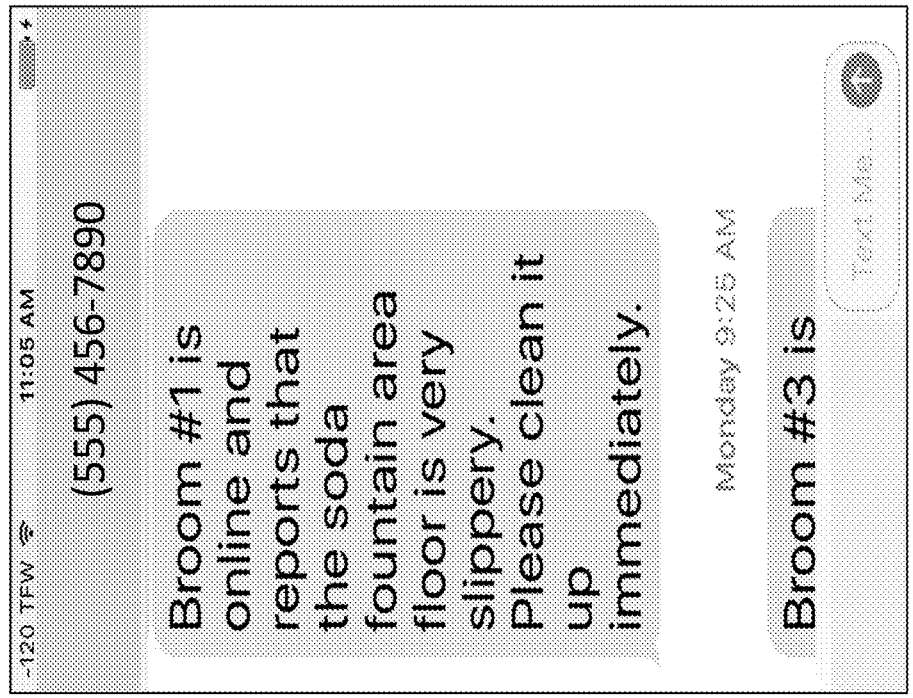
FIG. 17 is a view of an embodiment of a graphical user interface suitable for use with a floor condition tracking application constructed according to principles of the present disclosure, illustrating an alert message sent by the floor condition tracking application when the floor condition tracking application determines an area of the floor of the facility has a coefficient of friction that is below a predetermined threshold based upon the strain sensor readings taken by the head of the cleaning apparatus of FIG. 13.

FIG. 17 is a view of an embodiment of a graphical user interface 121 suitable for use with a floor condition tracking application constructed according to principles of the present disclosure. In the illustrated embodiment, an alert message is shown that was sent by the floor condition tracking application when the floor condition tracking application determines an area of the floor of the facility has a coefficient of friction that is below a predetermined threshold based upon the strain sensor readings taken by the head of the cleaning apparatus 90 of FIG. 13.

An embodiment of a slip reduction system constructed according to principles of the present disclosure is designed for ease of use without much training. Deployment includes installing beacons within the facility where readings are to be taken. Workers performing the cleanings are provided with badges (with unique RFIDs) that are used to identify which one of them is performed a particular cleaning operation. Store cleaning schedules are entered in a web-based form. Sample friction readings can be obtained where the flooring surface is dry to calibrate the system.

Flooring materials can be selected that have a low-slip classification to stand up to continuous risk of oil, grease and water spillages. In embodiments, the flooring has a minimum surface roughness level of 70 microns. In embodiments, the flooring design and material can vary based on conditions and expected usage.

Standardized floor surface cleaning methods can be developed. The tracking device of the cleaning apparatus can be used to monitor that each operator follows the standardized floor surface cleaning method developed for each area of the facility. The cleaning device includes a tracking device that interacts with beacons mounted at various locations/various checkpoints around the store. In embodiments, the checkpoints can comprise any suitable device, such as, a magnetic strip, a proximity microchip, such as RFIDs or NFC, or an optical barcode, for example. The tracking device mounted to the cleaning apparatus can be used to provide evidence of a cleaning regime and real-time feedback via dashboard or text message.

Procedures for dealing with spills can be developed and deployed when the coefficient of friction reading taken by the cleaning apparatus drops below a predetermined value.

Embodiments of a kit for reducing the occurrence of slipping on a floor surface constructed according to principles of the present disclosure can include a tracking device (to monitor cleaning and/or to measure the dynamic coefficient of friction), a plurality of beacons (e.g., three) to indicate location of the cleaning apparatus within the facility, and a floor condition tracking program stored on a non-transitory, tangible computer-readable medium. The kit can be configured to operate via a cellular connection—independent of the Wi-Fi network at the facility. This makes it faster and easier to deploy without the need for onsite visits. The kit can be drop shipped.

In embodiments, the tracking device can be attached to the cleaning apparatus that is already located onsite at the facility as a retrofit. In embodiments, the beacons comprise wireless (Bluetooth) beacons that are "stick-on" adhesive layer for ready attachment to a wall in the facility and do not require any wiring.

In embodiments, the kit includes identification cards with a unique identifier (e.g., a RFID) that is configured to identify which one of the workers at the facility is performing a particular cleaning operation. In embodiments, the kit includes a cellular hub to transmit data to the cloud and an account on the cloud-based management console that is associated with the particular facility receiving the kit.

In embodiments, the computing environment includes a suitable user interface adapted for entry of contact details (for alerts) and authorized worker information for a given facility. In embodiments, the interface is adapted to allow the facility manager to enter details on cleaning schedules and acceptable floor conditions (e.g., cleaning frequency and friction readings for different areas of the facility). In embodiments, the computing environment includes a floor condition tracking program that is adapted to issue an alert when the coefficient of friction measured by the cleaning apparatus is below a predetermined limit and report floor degradation over time.

In embodiments, the computing system includes a mobile app that is adapted to allow management to query a cloud-based console and to obtain alerts. The mobile app can be configured to perform tracing functions and to provide motivating messages for regularly cleaning the facility according to the determined cleaning schedule.

Parameters can be defined when cleanings have to be performed and where they should be performed within the facility. The cloud based management console makes sure those readings are received at the correct time. If a reading is not received, an alert can be sent by email or SMS to the store manager. In embodiments, an alert is are sent to management if the floor conditions require attention.

The computing environment is adapted to preserve records in a data storage device for later use, such as for management reports. In embodiments, the computing environment is adapted to allow for management reporting over multiple stores in different locations. In embodiments, the computing environment can include different reporting levels for different users (e.g., facility manager and regional executive management over a number of facilities).

Management reports can be configured by manager, location, facility or region. The data generated by the system can be used to support analysis over extended periods of time.

In embodiments, the computing environment includes graphical reporting capability/management dashboard features. In embodiments, the computing environment includes a security system to ensure data is protected and all user access is authenticated.

In embodiments, the computing environment includes extended access to cloud based data from a console and mobile access to also export through an API (Application Program Interface). The stored data can be imported into spreadsheets or other programs. Real time data reporting and alerts can be collected and displayed in a useful format, data feeds can be made available. Customizations can be made to provide roll up reporting of facility data.

In embodiments of a method of monitoring the cleaning conditions of a facility following principles of the present disclosure, a facility subscribes to a slip reduction service and receives a kit with the components to monitor and report both the cleaning operations occurring at the facility and the measurements of how slippery the floor is. This information is transmitted via a cellular connection to a cloud based service. Details of reading from the store are kept in the cloud for management. This information is used to generate alerts when cleaning operations have not been performed according to a predetermined schedule and/or if the floor condition should be checked due to a low coefficient of friction reading. It can also be used to respond to claims and monitor the overall cleanliness of stores.

Figure 18:
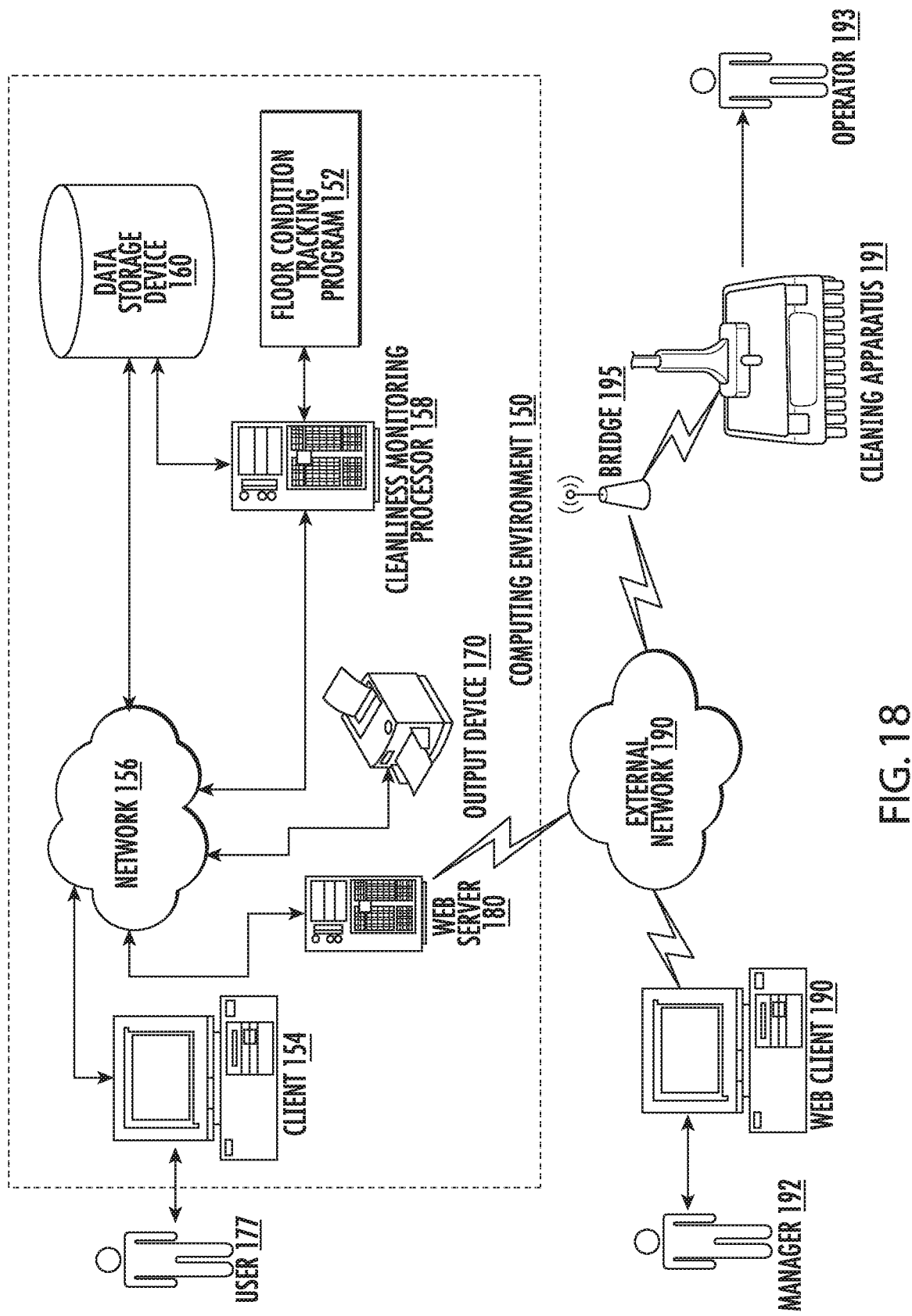
FIG. 18 is a schematic diagram of an embodiment of a computer-implemented system for monitoring the cleaning conditions of a facility constructed according to principles of the present disclosure.

Referring to FIG. 18, an embodiment of a computing environment 150 is shown that includes a floor condition tracking program 152 constructed according to principles of the present disclosure. In the illustrated embodiment, an operator 193 located at a facility and a manager 192 (either located at the facility or at an offsite location) can be in communication with the computing environment via an external network 190.

The floor condition tracking program 152 can be stored on a non-transitory, tangible computer-readable medium. The computing environment 150 constitutes a computer-implemented system for monitoring the cleaning conditions of at least one facility. In embodiments, the computing environment 150 can receive data from cleaning devices 191 deployed at a variety of locations distributed over a larger geographic region. The computing environment 150 can include a number of computer systems, which generally can include any type of computer system based on: a microprocessor, a mainframe computer, a digital signal processor, a portable computing device, a personal organizer, a device controller, or a computational engine within an appliance. In some embodiments, the computer environment 150 is implemented in one or more electronic devices that are located in one or more locations.

The illustrated computing environment 150 can include a client 154, an internal network 156, at least one cleanliness monitoring processor 158 operating the floor condition tracking program 152, a data storage device 160, an output device 170, and a web server 180 operatively connected to the external network 190. The client 154, the cleanliness monitoring processor 158, the data storage device 160, the output device 170, and the web server 180 are operatively connected together via the internal network 156. The cleanliness monitoring processor 158 can be specially programmed with the floor condition tracking program 152 to track and log the cleaning operations occurring at one or more facilities, to issue an alert to the manager 192 in the event that an operating parameter sensed by the cleaning apparatus 191 falls outside of an acceptable range, and to determine a cleaning index based upon the data the cleaning apparatus sends to the computing environment via the bridge 195.

At least one web client 190 can use the computing environment 150 to interface with the computing environment 150. For example, a manager 192 can use the web client 190 to receive information from, and to transmit information to, the computing environment 150 about the cleaning requirements of a given facility that is the subject of the cleanliness monitoring. The cleaning apparatus 191 and/or associated beacons at the facility can use a suitable bridge 195 to transmit cleaning parameter data from the facility for use by the floor condition tracking program 152. In some embodiments, a plurality of facilities can use other web client(s) to communicate with the floor condition tracking program 152 over the external network 190. In other embodiments, a different communication channel can be established between the facility, the manager, etc. and the floor condition tracking program 152 to transmit data feeds to the floor condition tracking program 152.

The client 154 can be used to communicate with an authorized user 177, for example, to enter cleaning parameter conditional requirements and criteria into the data storage device 160, to communicate with the web clients 190, and/or to execute the floor condition tracking program 152. The client 154 can comprise at least one input device. The client 154 can generally include any node on a network including computational capability and including a mechanism for communicating across the network 156.

In one embodiment, the client 154 hosts an application front end of the floor condition tracking program 152. The application front end can generally include any component of the floor condition tracking program 152 that can receive input from the user 177 or the client 154, communicate the input to the floor condition tracking program 152, receive output from the floor condition tracking program 152, and present the output to the user 177 and/or the client 154. In one embodiment, the application front end can be a stand-alone system.

The network 156 can generally include any type of wired or wireless communication channel capable of coupling together computing nodes. Examples of a suitable network 156 include, but are not limited to, a local area network, a wide area network, or a combination of networks.

The cleanliness monitoring processor 158 is in operable arrangement with the non-transitory, computer readable medium upon which the floor condition tracking program 152 is stored so as to be able to operate the program 152. The cleanliness monitoring processor 158 is configured to execute the floor condition tracking program 152 contained on the computer-readable medium. The cleanliness monitoring processor 158 can generally include any computational node including a mechanism for servicing requests from a client for computational resources, data storage resources, or a combination of computational and data storage resources. Furthermore, the cleanliness monitoring processor 158 can generally include any system that can host the floor condition tracking program 152. The cleanliness monitoring processor 158 can generally include any component of an application that can receive input from the web client(s) 190 via the web server 180 and from the client 154 through the network 156, process the input, and present the output to the floor condition tracking program 152, the client 154, the web server 180, and/or the data storage device 160. The cleanliness monitoring processor 158 can generally include any component of an application that can process data, interact with the data storage device 160, and execute logic for the floor condition tracking program 152.

The floor condition tracking program 152 comprises a computer program product residing on a non-transitory, tangible computer readable medium having a plurality of instructions stored thereon which, when executed by the cleanliness monitoring processor 158, cause the processor 158 to perform steps associated with monitoring the cleaning conditions of a facility as described herein. The floor condition tracking program 152 can be any suitable computer-implemented application for processing information exchanged with the client 154 and/or the web clients 190, 191 via a web platform such as those known to one of ordinary skill in the art. The floor condition tracking program 152 can contain computer executable instructions adapted to exchange information in the form of data with the data storage device 160. The floor condition tracking program 152 can include a graphical user interface which can facilitate the input of cleaning condition information into the floor condition tracking program 152.

In embodiments, the floor condition tracking program 152 includes a tracking module and a dynamic coefficient of friction calculation module. The tracking module includes a computer executable tracking code segment configured to use the data received from the bridge 195 to determine the cleaning activities occurring at the facility. The dynamic coefficient of friction calculation module includes a computer executable calculation code segment configured to determine the coefficient of friction encountered by the cleaning apparatus 191 while being used to clean at the facility based upon the strain sensor readings taken by the cleaning apparatus 191.

In embodiments, the floor condition tracking program 152 includes a cleaning parameter information module adapted to collect cleaning requirement information through a plurality of data fields. In embodiments, the floor condition tracking program 152 can display a graphical user interface to one or more managers 192 via the web-enabled interface provided by the web server 180. The graphical user interface can include the cleaning requirement information data fields. In other embodiments, the floor condition tracking program 152 can include a graphical user interface that is presented to the client 154 to input the cleaning requirement information into the cleaning parameter information module.

The architecture solution of the floor condition tracking program 152 is flexible and scalable to include additional information for different facilities and to include additional cleaning condition information requirements for the various facilities. In embodiments, the floor condition tracking program 152 includes other modules and computer-executable instructions adapted to carry out other steps and features of a method of monitoring the cleaning conditions of a facility following principles of the present disclosure. Any suitable computer-readable storage medium can be utilized for the floor condition tracking program 152, including, for example, hard drives, floppy disks, CD-ROM drives, tape drives, zip drives, flash drives, optical storage devices, magnetic storage devices, and the like.

The data storage device 160 is in operable arrangement with the cleanliness monitoring processor 158. The database or data storage device 160 can generally include any type of system for storing data in non-volatile storage. This includes, but is not limited to, systems based upon: magnetic, optical, and magneto-optical storage devices, as well as storage devices based on flash memory and/or battery-backed up memory. In embodiments, the data storage device 160 is operably arranged with the cleanliness monitoring processor 158 and is adapted to store cleaning operation data for each facility for which the system 150 is being used.

In one embodiment, the database 160 contains cleaning requirement data relating to a facility. The cleaning requirement data can include, for example, a minimum cleaning frequency for each of a number of areas of the facility, a minimum cleaning time for each cleaning operation occurring at each of the areas of the facility, and a minimum coefficient of friction value for each of the areas of the facility (such as one based upon the particular floor surface used at each are, the expected foot traffic of each area, etc.). This information can be used by the floor condition tracking program 152 to perform a method of monitoring the cleaning conditions of a facility, according to principles of the present disclosure. In embodiments, the data storage device 160 can store a data warehouse that comprises a collection of databases (e.g., Access, SQL). For example, the data storage device 160 can contain a permission database which stores user credentials and permissions specific to active users 177, managers 192, and others that interact with the computing environment 150.

The output device 170 can comprise a printer, a display monitor, and a connection to another device, for example. The output device 170 can be used to generate reports for sending to the manager 192 and/or each facility which contributed to the information generated by the floor condition tracking program 152. The output device 170 can be used to generate reports for sending to the manager 192 and/or each facility which contributed to the information generated by the floor condition tracking program 152 about the cleaning conditions of each facility being monitored. The output device 170 can be used to communicate to the user 177 information generated by the floor condition tracking program 152.

A report engine can be provided to generate displays of information stored in the data storage device 160 concerning the cleaning conditions tracked by the system 150, which can be viewed using the output device 170, for example. In one embodiment, the report engine further provides pre-configured and/or ad hoc reports relating to the cleaning conditions of each facility tracked by the system 150.

The web server 180 can provide a suitable web site or other Internet-based graphical user interface which is accessible by the manager 192, providing cleaning condition information data feeds, for example. The web server 180 can serve as a web-enabled interface adapted to exchange information with multiple facilities including to receive cleaning data from each facility via a suitable bridge 195, for example. In other embodiments, other sites can be connected to the web-enabled interface.

The web server 180 can provide access to an internet-based web platform that includes the floor condition tracking program 152. In some embodiments, the web server 180 can be adapted to host a web site, to execute enterprise applications, to deliver web pages and other content upon request to web clients, and to receive content from web clients. The web client(s) 190 and the bridge 195 can be connected to the web server 180 through the network connection 190 (e.g., Internet, Intranet, LAN, WAN and the like). The web server 180 can use an authentication server in order to validate and assign proper permissions to authorized users of the system. A permission database can store web user credentials and permissions specific to each user, investor, agent, broker, market information source, etc. The web server 180 can be outfitted with a firewall such that requests originating from outside the computing environment 150 pass through the firewall before being received and processed at the web server 180.

In addition to the components discussed above, the computing environment 150 can further include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases.

In yet other embodiments, the computing environment can include an electronic common repository for electronic documents relating to cleaning condition information. The electronic common repository can be used by users 177, managers 192, and others according to a set of authorized permissions to the respective party to upload electronic documents generated at different times of the process.

In other embodiments, systems and methods of monitoring the cleaning conditions of a facility, can be implemented on various types of computer architectures, such as for example on a single general purpose computer or workstation, on a networked system, in a client-server configuration, or in an application service provider configuration. Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform methods described herein. Other implementations may also be used, however, such as firmware or even appropriately designed hardware configured to carry out the methods and systems described herein.

The systems' and methods' data (e.g., associations, mappings, etc.) may be stored and implemented in one or more different types of computer-implemented ways, such as different types of storage devices and programming constructs (e.g., data stores, RAM, ROM, flash memory, flat files, databases, programming data structures, programming variables, IF-THEN (or similar type) statement constructs, etc.). It is noted that data structures describe formats for use in organizing and storing data in databases, programs, memory, or other tangible computer-readable media for use by a computer program.

The computer components, software modules, functions, data stores and data structures described herein may be connected directly or indirectly to each other in order to allow the flow of data needed for their operations. It is also noted that a module or processor can include but is not limited to a unit of code that performs a software operation, and can be implemented, for example, as a subroutine unit of code, a software function unit of code, an object (as in an object-oriented paradigm) or an applet and can be implemented in a computer script language or another type of computer code. The software components and/or functionality (e.g., the allocation functionality associated with the payment election) can be located on a single computer or distributed across multiple computers depending upon the particular circumstances surrounding its use (e.g., located on client and/or server computers).

In various embodiments, methods of monitoring the cleaning conditions of a facility in accordance with principles of the present disclosure operate as software programming operating on a computer processor. Dedicated hardware implementations, including, but not limited to, application-specific integrated circuits, programmable logic arrays and other hardware devices, can likewise be constructed to implement the methods described herein. Furthermore, alternative software implementations, including, but not limited to, distributed processing or component/object distributed processing, parallel processing, or virtual machine processing, can also be constructed to implement the methods described herein.

In various embodiments, a floor condition tracking program in accordance with principles of the present disclosure can take the form of a computer program product on a non-transitory, tangible computer-readable storage medium having computer-readable program code means embodied in the storage medium. Software implementations of the techniques for monitoring the cleaning conditions of a facility as described herein can be stored on any suitable tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, a non-transitory, tangible storage medium includes a distribution medium and art-recognized equivalents and successor media, in which the software implementations herein are stored.

Additionally, embodiments of a floor condition tracking program 152 stored upon a non-transitory, computer-readable medium following principles of the present disclosure contain a plurality of instructions which, when executed by the cleanliness monitoring processor 158, cause the processor 158 to perform steps associated with monitoring the cleaning conditions of a facility following principles of the present disclosure. In embodiments, the floor condition tracking program 152 stored upon a non-transitory, computer-readable medium can be configured to carry out any embodiment of a method of monitoring the cleaning conditions of a facility following principles of the present disclosure. In embodiment, the cleanliness monitoring processor 158 is adapted to execute the programming stored upon the non-transitory computer readable medium to perform various methods, processes, and modes of operations in a manner following principles of the present disclosure.

In embodiments of a method of monitoring the cleaning conditions of a facility following principles of the present disclosure, a system according to principles of the present disclosure can be used to monitor the cleaning conditions of a facility. In embodiments, a method of monitoring the cleaning conditions of a facility following principles of the present disclosure includes employing a processor to execute computer executable instructions stored on a tangible computer-readable medium to perform a step of periodically determining a dynamic coefficient of friction encountered by the cleaning apparatus 191 as it performs a cleaning operation. In embodiments, the method includes monitoring at least one of the location of the cleaning apparatus within the facility, the movement of the cleaning apparatus about the facility, and the dynamic coefficient of friction encountered by the cleaning apparatus as it traverses over a flooring surface during a cleaning operation.

In one embodiment of a method of monitoring a cleaning condition of a facility following principles of the present disclosure, a cleaning apparatus is moved upon a surface within the facility. A sensor is used to measure a condition of the surface upon which the cleaning apparatus is moving. The sensor generates a condition signal indicative of the condition measured by the sensor. The condition signal is transmitted to a processor. The processor is used to execute computer executable instructions stored on a non-transitory computer-readable medium to determine whether a parameter of the surface is within a predetermined range based upon the condition signal.

In embodiments, the sensor is a strain sensor. The strain sensor is arranged with the cleaning apparatus such that the strain sensor is configured to measure a resistance encountered by the cleaning apparatus as the cleaning apparatus moves upon the surface. The strain sensor generates a strain signal indicative of the resistance. The processor determines whether the parameter of the surface is within the predetermined range by calculating a dynamic coefficient of friction encountered by the cleaning apparatus moving upon the surface based upon the strain signal generated by the strain sensor.

In embodiments, the method further includes monitoring movement of the cleaning apparatus within the facility using a tracking assembly. The tracking assembly includes a first tracking unit and a plurality of second tracking units. The first tracking unit is mounted to the cleaning apparatus. The second tracking units are located in spaced relationship to each other within the facility.

Each second tracking unit interacts with the first tracking unit to detect when the cleaning apparatus is within a detection area of the respective second tracking unit. The second tracking units transmit to the processor location data concerning the cleaning apparatus based upon the location signal received from the first tracking unit. The processor executes computer executable instructions stored on the non-transitory computer-readable medium to determine the location of the cleaning apparatus within the facility over time. The method can include using the processor to execute computer executable instructions stored on the non-transitory computer-readable medium to determine whether a predetermined cleaning operation was performed by the cleaning apparatus within a specified time schedule based upon the determined location of the cleaning apparatus within the facility over time.

In embodiments, a method of monitoring a cleaning condition of a facility following principles of the present disclosure includes monitoring for the regular practice of cleaning operations according to a predetermined schedule and/or cleaning regime. In embodiments, cleaning operations are substantially continuously monitored to help provide more accurate records and reduce the occurrence of slip-and-fall accidents.

In embodiments, a method of monitoring a cleaning condition of a facility following principles of the present disclosure includes logging, via the computing environment, the identity of the operator performing the cleaning operation in a database of cleaning data.

In embodiments, a method of monitoring a cleaning condition of a facility following principles of the present disclosure includes issuing an alert message, via the computing environment, when a specified cleaning operation has not been performed by a given time (or within a given frequency) and/or within a given area of the facility. In embodiments, the computing environment issues an alert message when it determines, based upon floor condition data received from the cleaning apparatus, the floor condition falls outside of a specified acceptable range (e.g., the measured dynamic coefficient of friction falls below a predetermined value for that particular area of the facility).

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A system for monitoring a cleaning condition of a facility, the system comprising:
   a cleaning apparatus;
   a tracking assembly, the tracking assembly configured to monitor movement of the cleaning apparatus within the facility, the tracking assembly including a first tracking unit and a plurality of second tracking units, the first tracking unit associated with the cleaning apparatus, the first tracking unit configured to wirelessly emit a location signal, and the second tracking units located in spaced relationship to each other within the facility, each second tracking unit configured to interact with the first tracking unit to detect when the cleaning apparatus is within a detection area of the respective second tracking unit, the second tracking units configured to transmit location data concerning the cleaning apparatus;
   a non-transitory computer-readable medium, the non-transitory computer-readable medium bearing a floor condition tracking program;

a processor, the processor in operable arrangement with the second tracking units to receive the location data therefrom and in operable arrangement with the non-transitory, computer-readable medium, the processor configured to execute the floor condition tracking program contained on the non-transitory computer-readable medium;

wherein the floor condition tracking program includes a tracking module configured to analyze the location data from the second tracking units to determine whether a predetermined cleaning operation was performed within a specified time schedule.

2. The system of claim 1, further comprising:
a user identification device, the user identification device configured to transmit an identification signal configured to identify which one of a plurality of operators is associated with the user identification device;
an identification reader, the identification reader associated with the cleaning apparatus, the identification reader configured to interact with the user identification device to receive the identification signal from the user identification device and to transmit the identification signal to the processor;
wherein the tracking module of the floor condition tracking program is configured to associate the location data received from the cleaning apparatus to the operator associated with the identification signal received from the identification reader.

3. The system of claim 1, wherein the tracking module of the floor condition tracking program is configured, in response to determining a cleaning operation was not performed with the time schedule, to generate and send an electronic alert message to at least one recipient to alert the recipient that the cleaning operation did not occur according to the time schedule.

4. The system of claim 1, wherein the first tracking unit is configured to generate a Bluetooth radio wave on a frequency between 2.402 GHz and 2.480 GHz, and the second tracking units each comprises a Bluetooth beacon.

5. The system of claim 4, further comprising:
a communication bridge, the communication bridge configured to receive location data from the beacons and to transmit the location data to the processor.

6. The system of claim 1, wherein the cleaning apparatus includes a motion detector and a communication device, the motion detector configured to detect movement of the cleaning apparatus upon a surface within the facility during a cleaning operation, the motion detector configured to generate a motion signal indicative of the movement of the cleaning apparatus upon the surface, and the communication device being in electrical communication with the motion detector to receive the motion signal, the communication device configured to transmit the motion signal to the processor, and wherein the tracking module of the floor condition tracking program is configured to analyze the motion signal to determine whether the cleaning operation has been performed within the specified time schedule.

7. The system of claim 6, further comprising:
a user identification device, the user identification device configured to transmit an identification signal configured to identify which one of a plurality of operators is associated with the user identification device;
an identification reader, the identification reader associated with the cleaning apparatus, the identification reader configured to interact with the user identification device to receive the identification signal from the user identification device and to transmit the identification signal to the processor;
wherein the tracking module of the floor condition tracking program is configured to associate the location data and the motion signal received from the cleaning apparatus to the operator associated with the identification signal received from the identification reader.

8. The system of claim 1, wherein the cleaning apparatus includes a sensor and a communication device, the sensor configured to measure a condition of a surface upon which the cleaning apparatus moves, the sensor configured to generate a condition signal indicative of the condition measured by the sensor, and the communication device in electrical communication with the sensor to receive the condition signal, the communication device configured to transmit the condition signal to the processor, and wherein the floor condition tracking program includes a floor condition module, the floor condition module configured to determine whether a parameter of the surface is within a predetermined range based upon the condition signal.

9. The system of claim 8, wherein the sensor is configured to measure a friction condition of the surface upon which the cleaning apparatus moves, and the floor condition module includes a computer executable calculation code segment configured to determine a coefficient of friction encountered by the cleaning apparatus moving upon the surface based upon the condition signal received from the sensor.

10. The system of claim 9, wherein the sensor comprises a strain sensor, the strain sensor arranged with the cleaning apparatus such that the strain sensor is configured to measure a resistance encountered by the cleaning apparatus as the cleaning apparatus moves upon the surface, the strain sensor configured to generate a strain signal indicative of the resistance, and wherein the calculation code segment is configured to determine a dynamic coefficient of friction encountered by the cleaning apparatus moving upon the surface based upon the strain signal received from the strain sensor.

11. A method of monitoring a cleaning condition of a facility, the method comprising:
moving a cleaning apparatus upon a surface within the facility;
using a sensor to measure a condition of the surface upon which the cleaning apparatus is moving, the sensor generating a condition signal indicative of the condition measured by the sensor;
transmitting the condition signal to a processor;
using the processor to execute computer executable instructions stored on a non-transitory computer-readable medium to determine whether a parameter of the surface is within a predetermined range based upon the condition signal;
wherein the sensor comprises a strain sensor, the strain sensor arranged with the cleaning apparatus such that the strain sensor is configured to measure a resistance encountered by the cleaning apparatus as the cleaning apparatus moves upon the surface, the strain sensor generating a strain signal indicative of the resistance, and the processor determines whether the parameter of the surface is within the predetermined range by calculating a dynamic coefficient of friction encountered by the cleaning apparatus moving upon the surface based upon the strain signal generated by the strain sensor.

12. The method of monitoring according to claim 11, further comprising:

monitoring movement of the cleaning apparatus within the facility using a tracking assembly, the tracking assembly including a first tracking unit and a plurality of second tracking units, the first tracking unit associated with the cleaning apparatus, and the second tracking units located in spaced relationship to each other within the facility, wherein:

each second tracking unit interacts with the first tracking unit to detect when the cleaning apparatus is within a detection area of the respective second tracking unit, the second tracking units transmit to the processor location data concerning the cleaning apparatus based upon the location signal received from the first tracking unit, and the processor executes computer executable instructions stored on the non-transitory computer-readable medium to determine the location of the cleaning apparatus within the facility over time;

using the processor to execute computer executable instructions stored on the non-transitory computer-readable medium to determine whether a predetermined cleaning operation was performed by the cleaning apparatus within a specified time schedule based upon the determined location of the cleaning apparatus within the facility over time.

13. A cleaning apparatus comprising:

a scrubbing member;

a sensor, the sensor configured to measure a condition of a surface upon which the scrubbing member moves, the sensor configured to generate a condition signal indicative of the condition measured by the sensor;

a communication device, the communication device in electrical communication with the sensor to receive the condition signal, the communication device configured to transmit the condition signal to a remote receiver;

a motion detector, the motion detector configured to detect movement of the scrubbing member upon the surface, the motion detector configured to generate a motion signal indicative of the movement of the scrubbing member upon the surface;

wherein the communication device is in electrical communication with the motion detector to receive the motion signal, the communication device configured to transmit the motion signal to a remote receiver.

14. The cleaning apparatus of claim 13, wherein the sensor is configured to measure a friction condition of the surface upon which scrubbing member moves.

15. The cleaning apparatus of claim 14, wherein the sensor comprises a strain sensor, the strain sensor arranged with the scrubbing member such that the strain sensor is configured to measure a resistance encountered by the scrubbing member as the scrubbing member moves along a surface being cleaned, the strain sensor being configured to generate a strain signal indicative of the resistance.

16. The cleaning apparatus of claim 15, further comprising:

a tracking device, the tracking device configured to wirelessly emit a location signal to a remote receiver for determining a location of the cleaning apparatus.

17. The cleaning apparatus of claim 16, wherein the tracking device is configured to generate a Bluetooth radio wave on a frequency between 2.402 GHz and 2.480 GHz.

18. The cleaning apparatus of claim 13, wherein the motion detector comprises an accelerometer.

* * * * *